United States Patent
Taguchi et al.

(10) Patent No.: US 7,730,259 B2
(45) Date of Patent: Jun. 1, 2010

(54) METHOD, COMPUTER AND SYSTEM FOR MANAGING A STORAGE SUBSYSTEM CONFIGURATION

(75) Inventors: Yuichi Taguchi, Sagamihara (JP); Jun Mizuno, Yokohama (JP); Masayuki Yamamoto, Sagamihara (JP); Toshihiko Shinozaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 515 days.

(21) Appl. No.: 11/684,781

(22) Filed: Mar. 12, 2007

(65) Prior Publication Data

US 2008/0162810 A1    Jul. 3, 2008

(30) Foreign Application Priority Data

Dec. 28, 2006    (JP) .............................. 2006-356387

(51) Int. Cl.
    *G06F 12/00*    (2006.01)
(52) U.S. Cl. ..................................... 711/114
(58) Field of Classification Search .................. 711/114
    See application file for complete search history.

(56) References Cited

U.S. PATENT DOCUMENTS

| 6,405,284 | B1* | 6/2002 | Bridge .......................... 711/114 |
| 6,510,164 | B1* | 1/2003 | Ramaswamy et al. ........ 370/466 |
| 6,976,140 | B2 | 12/2005 | Satoyama et al. |
| 7,120,912 | B2 | 10/2006 | Kadoiri et al. |
| 7,143,235 | B1* | 11/2006 | Watanabe et al. ............ 711/114 |
| 7,251,664 | B2 | 7/2007 | Fukuda et al. |
| 7,627,617 | B2* | 12/2009 | Kavuri et al. ................ 707/204 |
| 2003/0009619 | A1 | 1/2003 | Kano et al. |
| 2004/0257857 | A1 | 12/2004 | Yamamoto et al. |
| 2005/0262386 | A1 | 11/2005 | Numanol |
| 2006/0230189 | A1 | 10/2006 | Sahara et al. |
| 2007/0033368 | A1* | 2/2007 | Taguchi et al. .............. 711/170 |

FOREIGN PATENT DOCUMENTS

| JP | 2003-015915 | 1/2003 |
| JP | 2003296153 | 10/2003 |
| JP | 2003345525 | 12/2003 |
| JP | 2005-011277 | 1/2005 |
| JP | 200525244 | 1/2005 |
| JP | 2005309748 | 11/2005 |
| JP | 2006040026 | 2/2006 |
| JP | 2006293459 | 10/2006 |

OTHER PUBLICATIONS

JP 2005-25244 corresponds to U.S. Patent No. 7,251,664.

* cited by examiner

*Primary Examiner*—Matt Kim
*Assistant Examiner*—Hamdy S Ahmed
(74) *Attorney, Agent, or Firm*—Brundidge & Stanger, P.C.

(57) ABSTRACT

Provided is a storage subsystem configuration management method for use in a computer system, comprising: obtaining storage configuration information and hardware resource use information; determining, based on the obtained hardware resource use information, a configuration of a storage subsystem so that a load is not concentrated on a specific hardware resource; transmitting a configuration change instruction to make a change to the determined configuration to the storage subsystem; and making a configuration change based on the configuration change instruction received from the management computer through the first interface.

19 Claims, 25 Drawing Sheets

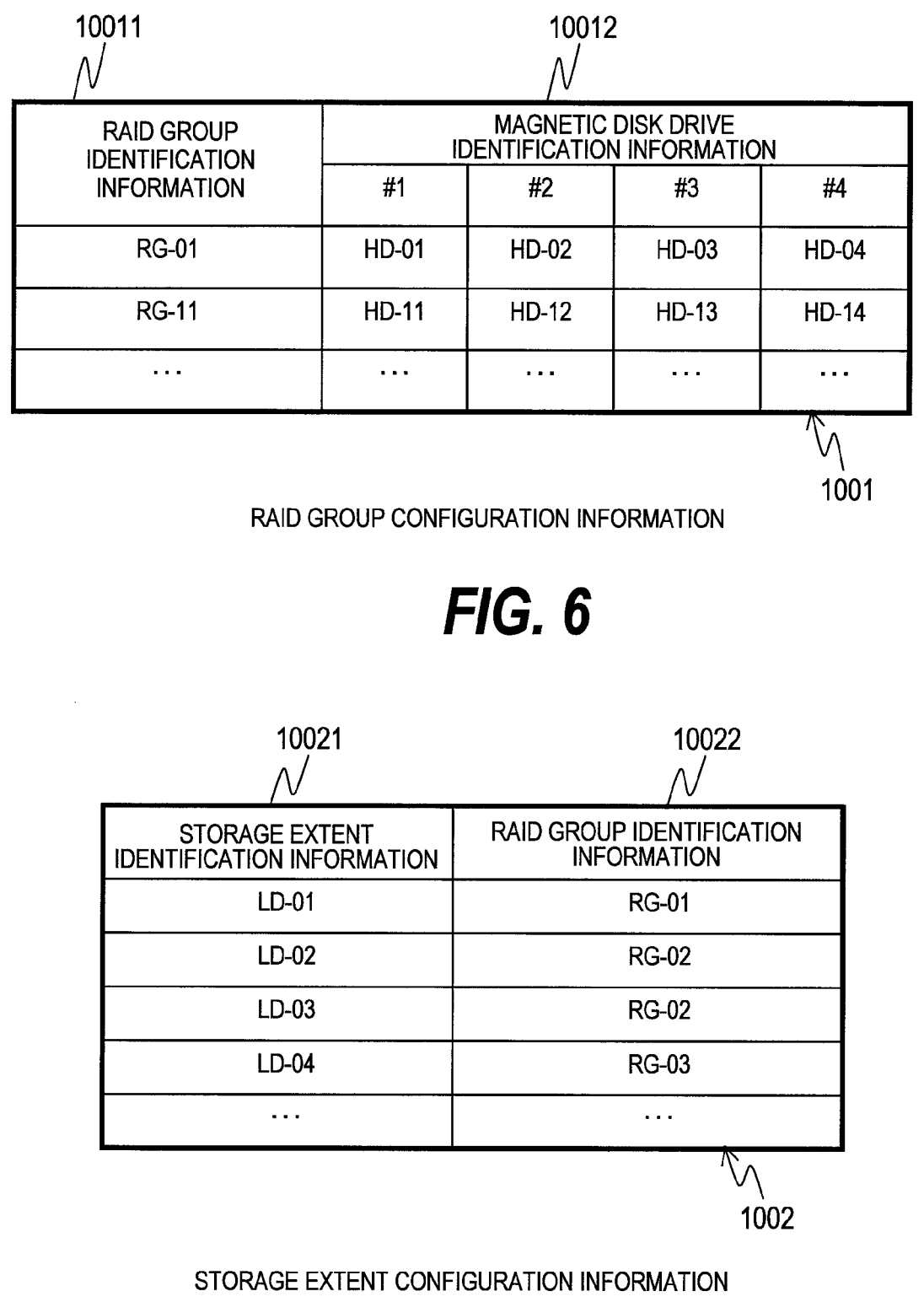

| RAID GROUP IDENTIFICATION INFORMATION | MAGNETIC DISK DRIVE IDENTIFICATION INFORMATION | | | |
|---|---|---|---|---|
| | #1 | #2 | #3 | #4 |
| RG-01 | HD-01 | HD-02 | HD-03 | HD-04 |
| RG-11 | HD-11 | HD-12 | HD-13 | HD-14 |
| ... | ... | ... | ... | ... |

RAID GROUP CONFIGURATION INFORMATION

FIG. 6

| STORAGE EXTENT IDENTIFICATION INFORMATION | RAID GROUP IDENTIFICATION INFORMATION |
|---|---|
| LD-01 | RG-01 |
| LD-02 | RG-02 |
| LD-03 | RG-02 |
| LD-04 | RG-03 |
| ... | ... |

STORAGE EXTENT CONFIGURATION INFORMATION

FIG. 7

| COMMUNICATION INTERFACE IDENTIFICATION INFORMATION | STORAGE UNIT IDENTIFICATION INFORMATION | STORAGE EXTENT IDENTIFICATION INFORMATION |
|---|---|---|
| PT-01 | VU-01 | n/a |
| PT-02 | VU-02 | n/a |
| ... | ... | ... |

LOGICAL UNIT CONFIGURATION INFORMATION 1003A

FIG. 8A

| COMMUNICATION INTERFACE IDENTIFICATION INFORMATION | STORAGE UNIT IDENTIFICATION INFORMATION | STORAGE EXTENT IDENTIFICATION INFORMATION |
|---|---|---|
| PT-11 | LU-11 | LD-11 |
| PT-11 | LU-12 | LD-12 |
| PT-12 | LU-11 | LD-13 |
| PT-12 | LU-12 | LD-14 |
| PT-12 | LU-13 | LD-15 |
| ... | ... | ... |

LOGICAL UNIT CONFIGURATION INFORMATION 1003B

FIG. 8B

| EXTERNAL STORAGE EXTENT IDENTIFICATION INFORMATION 10041 | COMMUNICATION INTERFACE IDENTIFICATION INFORMATION 10042 | STORAGE UNIT IDENTIFICATION INFORMATION 10043 |
|---|---|---|
| ED-01 | PT-11 | LU-11 |
| ED-02 | PT-11 | LU-12 |
| ED-03 | PT-12 | LU-11 |
| ED-04 | PT-12 | LU-12 |
| ED-05 | PT-12 | LU-13 |
| ... | ... | ... |

EXTERNAL STORAGE MAP INFORMATION

FIG. 9

| VIRTUAL STORAGE RESOURCE POOL IDENTIFICATION INFORMATION 10051 | VIRTUAL STORAGE EXTENT IDENTIFICATION INFORMATION 10052 | STORAGE EXTENT IDENTIFICATION INFORMATION 10053 |
|---|---|---|
| PL-01 | VD-01 | LD-01 |
| PL-01 | VD-02 | LD-02 |
| PL-01 | VD-03 | LD-03 |
| PL-02 | VD-11 | ED-02 |
| PL-02 | VD-12 | ED-03 |
| PL-02 | VD-13 | ED-04 |
| PL-02 | VD-14 | ED-05 |
| ... | ... | |

VIRTUAL STORAGE RESOURCE POOL CONFIGURATION INFORAMTION

FIG. 10

| 10061 | 10062 |
|---|---|
| VIRTUAL STORAGE UNIT IDENTIFICATION INFORMATION | VIRTUAL STORAGE RESOURCE POOL IDENTIFICATION INFORMATION |
| VU-01 | PL-01 |
| VU-02 | PL-02 |
| ... | ... |

1006

VIRTUAL STORAGE UNIT CONFIGURATION INFORMATION

FIG. 11

| 10073 | 10071 | 10072 |
|---|---|---|
| STORAGE SUBSYSTEM IDENTIFICATION NAME | DATA I/O INTERFACE IDENTIFICATION INFORMATION | COMMUNICATION INTERFACE BANDWIDTH |
| Disk Array 02 | PT-11 | 1 Gbps |
| Disk Array 02 | PT-12 | 2 Gbps |
| ... | ... | ... |

1007

DATA I/O INTERFACE CONFIGURATION INFORMATION

FIG. 12

| 10081 | 10082 |
|---|---|
| STORAGE SUBSYSTEM IDENTIFICATION NAME | MANAGEMENT INTERFACE IDENTIFICATION INFORMATION |
| Disk Array 01 | 192.168.0.1 |

1008

MANAGEMENT INTERFACE CONFIGURATION INFORMATION

FIG. 13

| RAID GROUP IDENTIFICATION INFORMATION (50111) | VIRTUAL STORAGE EXTENT REGISTRATION NUMBER (50112) |
|---|---|
| RG-01 | 1 |
| RG-02 | 2 |
| RG-03 | 0 |
| ... | ... |

5011

RAID GROUP MAPPING INFORMATION

FIG. 14

| COMMUNICATION INTERFACE IDENTIFICATION INFORMATION (50121) | COMMUNICATION INTERFACE BANDWIDTH (50122) | EXTERNAL STORAGE EXTENT CONNECTION PATH NUMBER (50123) |
|---|---|---|
| PT-11 | 1 Gbps | 1 |
| PT-12 | 2 Gbps | 3 |
| ... | ... | ... |

5012

EXTERNAL STORAGE COMMUNICATION PATH MAPPING INFORMATION

FIG. 15

METHOD, COMPUTER AND SYSTEM FOR MANAGING A STORAGE SUBSYSTEM CONFIGURATION

CLAIM OF PRIORITY

The present application claims priority from Japanese patent application 2006-356387 filed on Dec. 28, 2006, the content of which is hereby incorporated by reference into this application.

BACKGROUND

This invention relates to a technique of managing performance of a storage system including virtualized storage extents, and more particularly, to a technique for equalizing loads on hardware resources.

A storage area network (SAN) is known as a technique of connecting one or more external storage devices and one or more computers to each other. The storage area network is in particular effective in a case where a plurality of computers share one large-scale storage device. In a storage system including the storage area network, it is possible to add or delete a storage device or a computer with ease, which means that the storage system excels in extensibility.

In general, as an external storage device connected to the SAN, a disk array device is often used. The disk array device is a device equipped with many magnetic storage devices represented by hard disk drives.

The disk array device uses a redundant array of independent disks (RAID) technique to manage several magnetic storage devices as one RAID group. The RAID group forms one or more logical storage extents. The computers connected to the SAN carry out processing for inputting/outputting data into/from the storage extents. When data is recorded in the storage extents, the disk array device records redundant data in the magnetic storage devices configuring the RAID group. By recording the redundant data in this manner, even when one of the magnetic storage devices has failed, it becomes possible to restore data.

To the SAN, it is possible to connect different kinds of storage subsystems. Therefore, it is required for an operation manager to exercise management while giving consideration to device characteristics, which increases a burden on him/her.

A virtual storage technique provides a host computer with a storage capacity equipped for a separately existing storage subsystem by virtualizing the storage capacity so that it is possible to deal with the storage capacity as a resource stored in a virtualized storage subsystem. Therefore, it becomes possible to collectively manage resources on different kinds of storage subsystems having different characteristics, which makes it possible to alleviate a management burden (refer to JP 2005-011277 A).

Further, in conventional SAN operation, when a storage volume is mounted to a file system operated by a host computer, it is required to statically allocate a corresponding physical disk capacity in advance. In addition, a vast number of steps including system halt, are required for capacity addition and volume creation and deletion.

A thin provisioning technique provides a host computer with a storage volume in virtual units instead of allocating a physical disk capacity in advance. In addition, when writing from the host has occurred, an extent is dynamically allocated from a storage resource pool. Therefore, it is only necessary that the storage resource pool defined in advance is configured using a capacity that is small as compared with a virtual volume, which improves capacity use efficiency. Still in addition, in pool capacity addition, no influence is exerted on the host computer, so operation is simplified and it becomes possible to alleviate management burden (refer to JP 2003-015915 A).

In this specification, a storage extent provided to a host computer with the virtual storage technique is referred to as the "external storage extent" and a storage extent provided to the host computer with the thin provisioning technique is referred to as the "virtual storage extent", thereby distinguishing these storage extents from each other.

SUMMARY

In a storage system into which the thin provisioning technique has been introduced, an attempt is made to equally distribute a load among storage volumes registered in a storage resource pool. When there is an input into a virtual volume, the storage system sequentially allocates extents from the storage volumes dynamically configuring the pool with a virtual volume function. By distributing the allocated extents among a plurality of hardware resources in this manner, an input/output load is distributed.

Depending on a manner of allocation of the storage volumes to the resource pool, however, there is a fear that the load will be concentrated on certain hardware resources. For instance, when the storage volumes configuring the resource pool belong to the same RAID group, even when different storage volumes are allocated, the same hardware, that is, the same RAID group is allocated, so the concentration of the load occurs.

In a like manner, in a configuration to which the virtual storage technique has been applied, there is a fear that even when an attempt is made to equally distribute a load among storage volumes configuring a resource pool, the load will be concentrated on a communication interface on a different device side.

This invention has been made in the light of the problems described above and has an object to suppress degradation of performance due to concentration of a load on a specific hardware resource in a storage subsystem to which a thin provisioning technique or a virtual storage technique has been applied.

A representative aspect of this invention is as follows. That is, there is provided a storage subsystem configuration management method for use in a computer system, the computer system having a storage subsystem, a host computer connected to the storage subsystem through a network, and a management computer that is capable of accessing the storage subsystem and the host computer, in which: the storage subsystem includes a first interface that is connected to the network, a first processor that is connected to the first interface, a first memory that is connected to the first processor, and a storage device that stores data read and written by the host computer; the host computer includes a second interface that is connected to the network, a second processor that is connected to the second interface, and a second memory that is connected to the second processor; the management computer includes a third interface that is connected to the network, a third processor that is connected to the third interface, and a third memory that is connected to the third processor; the storage subsystem includes a virtual storage resource pool configured by at least one virtual storage extent; and the virtual storage extent is allocated with at least one of a storage resource of the storage device and a storage resource of an external storage device provided by an external storage subsystem connected to the storage subsystem equipped with the storage device, and is provided to the host computer as a storage extent from and into which data is read and written, the storage subsystem configuration management method comprising: obtaining, by the management computer, storage configuration information, which includes at least one of information about a configuration of a RAID group configured by the storage device and information about a configuration of an interface connected to the external storage device, from the storage subsystem through the third interface; obtaining, by the management computer, hardware resource use information, which includes at least one of information about use of the storage resource provided to the host computer through the virtual storage extent and information about use of the interface connected to the external storage device, based on the obtained storage configuration information; determining, by the management computer, based on the obtained hardware resource use information, a configuration of the storage subsystem so that a load is not concentrated on a specific hardware resource; transmitting, by the management computer, a configuration change instruction to make a change to the determined configuration to the storage subsystem; and making, by the storage subsystem, a configuration change based on the configuration change instruction received from the management computer through the first interface.

According to an embodiment of this invention, it becomes possible to suppress degradation of performance of a storage subsystem due to concentration of a load on a specific hardware resource.

BRIEF DESCRIPTION OF THE DRAWINGS

The present invention can be appreciated by the description which follows in conjunction with the following figures, wherein:

FIG. 6 is a configuration diagram showing an example of a configuration of the RAID group configuration information stored in the storage subsystem according to the embodiment of this invention;

FIG. 7 is a configuration diagram showing an example of a configuration of the storage extent configuration information stored in the storage subsystem according to the embodiment of this invention;

FIG. 8A is a configuration diagram showing an example of a configuration information stored in the storage subsystem in the case where the storage units identified by the storage unit identification information are virtual storage units according to the embodiment of this invention;

FIG. 8B is a configuration diagram showing an example of a configuration information stored in the storage subsystem in the case where the storage units identified by the storage unit identification information are provided in the storage subsystem according to the embodiment of this invention;

FIG. 9 is a configuration diagram showing an example of a configuration of the external storage map information stored in the storage subsystem according to the embodiment of this invention;

FIG. 10 is a configuration diagram showing an example of a configuration of the virtual storage resource pool configuration information stored in the storage subsystem according to the embodiment of this invention;

FIG. 11 is a configuration diagram showing an example of a configuration of the virtual storage unit configuration information stored in the storage subsystem according to the embodiment of this invention;

FIG. 12 is a configuration diagram showing an example of a configuration of the data I/O interface configuration information stored in the storage subsystem according to the embodiment of this invention;

FIG. 13 is a configuration diagram showing an example of a configuration of the management interface configuration information stored in the storage subsystem according to the embodiment of this invention;

FIG. 14 is a configuration diagram showing an example of a configuration of the RAID group mapping information stored in the management computer according to the embodiment of this invention;

FIG. 15 shows an example of a configuration of the external storage communication path mapping information stored in the management computer according to the embodiment of this invention;

DETAILED DESCRIPTION OF THE PREFERRED EMBODIMENTS

Hereinafter, an embodiment of this invention will be described with reference to the accompanying drawings.

Figure 1:
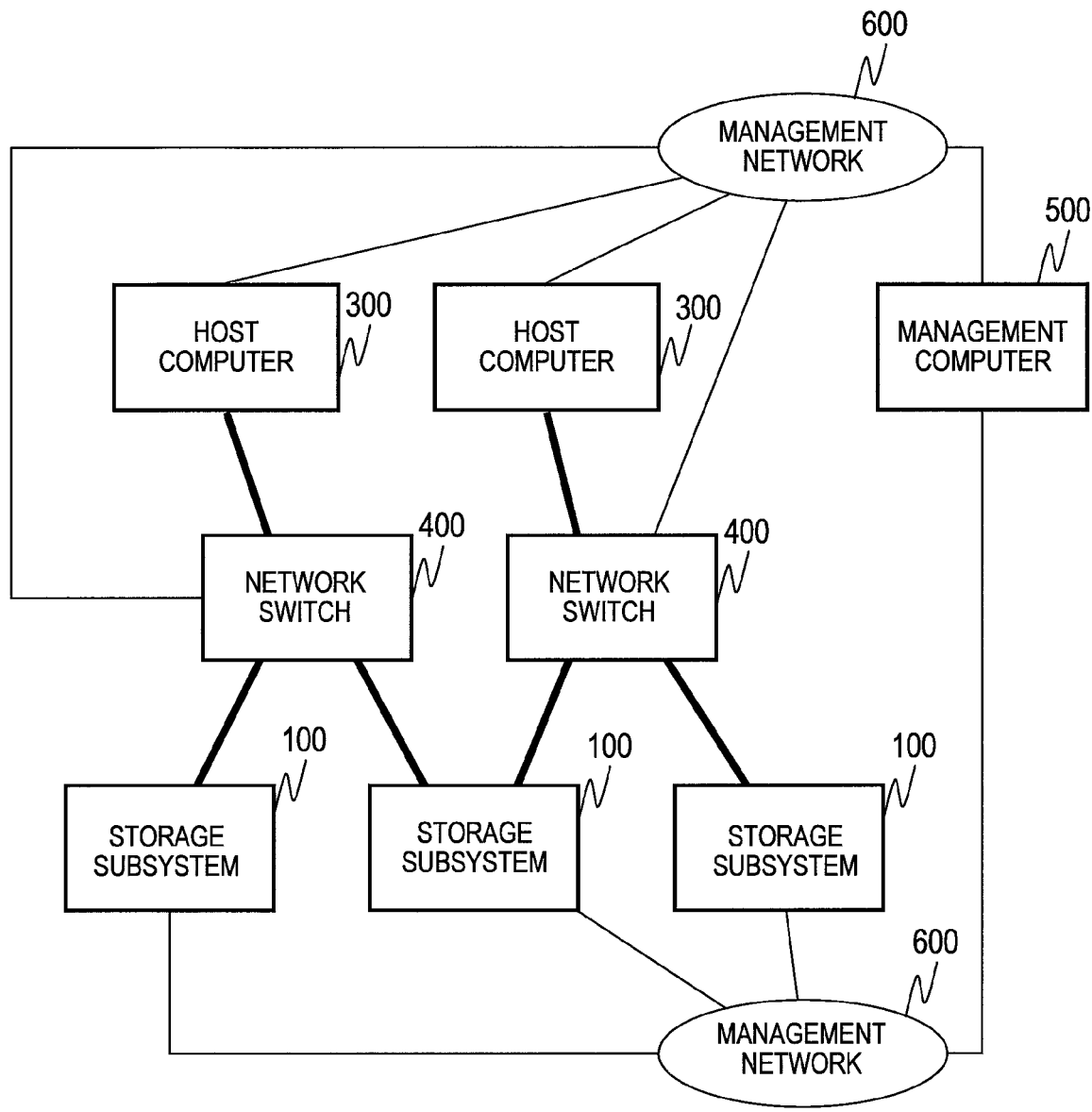
FIG. 1 is a block diagram showing a configuration of a storage area network according to an embodiment of this invention.

FIG. 1 shows a configuration of a storage area network according to the embodiment of this invention. The storage area network is configured by a data I/O network and management networks 600.

The data I/O network includes storage subsystems 100, host computers 300, and network switches 400. The host computers 300 and the storage subsystems 100 are connected to each other through the network switches 400, thereby enabling mutual data input/output. The data I/O network is illustrated using thick lines in FIG. 1. The data I/O network is a network based on a conventional technique such as Fibre Channel or Ethernet.

Each management network 600 is a network based on a conventional technique such as Fibre Channel or Ethernet. The storage subsystems 100, the host computers 300, and the network switches 400 are connected to a management computer 500 through the management network 600.

Each host computer 300 runs an application, such as a database or a file server, and carries out input/output of data into/from storage extents. Each storage subsystem 100 is equipped with a storage device, such as a magnetic disk drive or a semiconductor storage device, and provides data storage extents. Each network switch 400 is a device that connects the host computer 300 and the storage subsystem 100 to each other and is a Fibre Channel switch, for instance.

It should be noted here that in the embodiment of this invention, a form in which the management network 600 and the data I/O network are independent of each other is used, but a form in which a single network having both of a function of the management network 600 and a function of the data I/O network is provided may be used instead.

Figure 2:
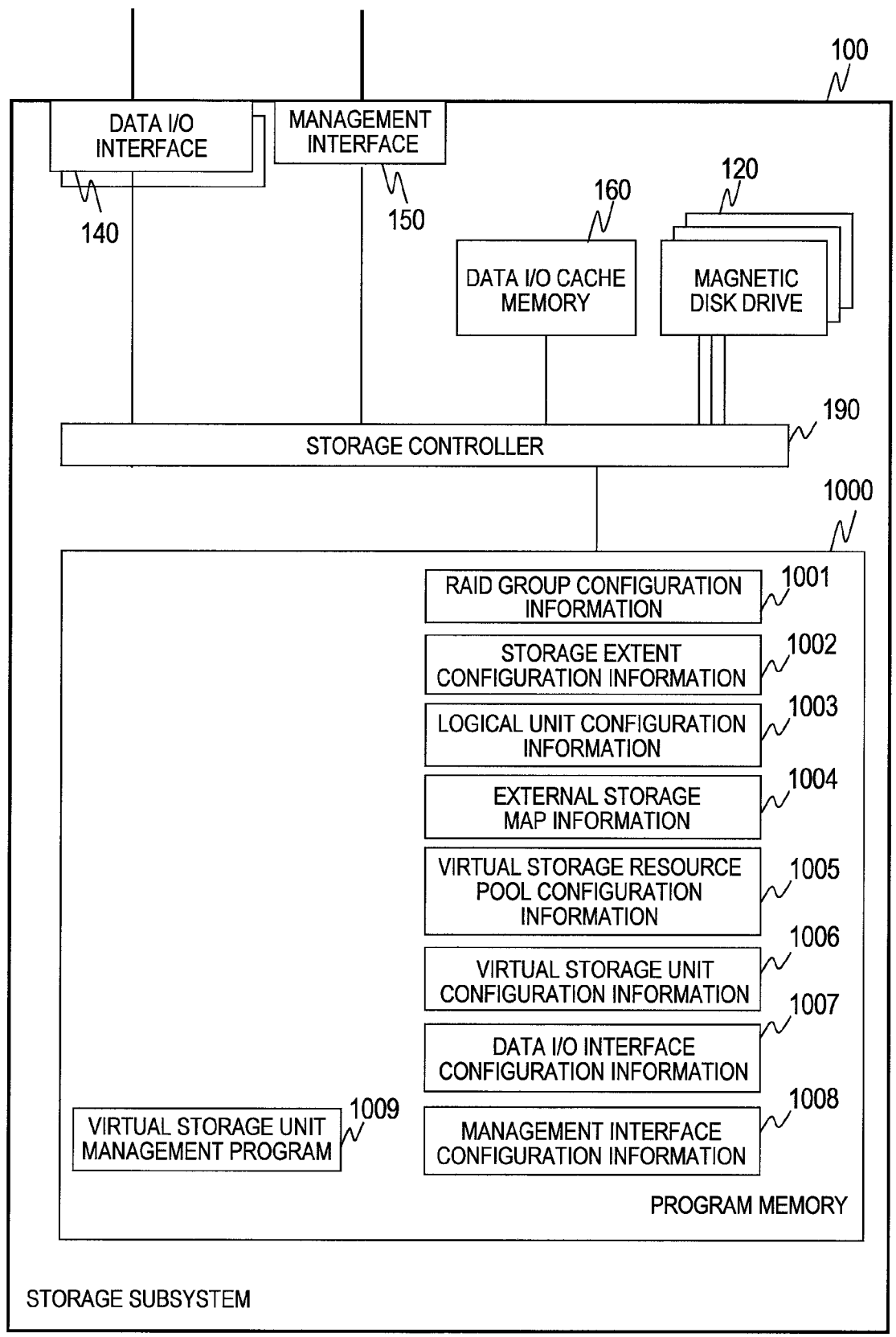
FIG. 2 is a block diagram showing a configuration of the storage subsystem according to the embodiment of this invention.

FIG. 2 shows a configuration of the storage subsystem 100 according to the embodiment of this invention. The storage subsystem 100 includes data I/O interfaces 140, management interfaces 150, a storage controller 190, a program memory 1000, data I/O cache memories 160, and magnetic disk drives 120. The data I/O interfaces 140, the management interfaces 150, the program memory 1000, the data I/O cache memories 160, and the magnetic disk drives 120 are connected to one another through the storage controller 190.

The data I/O interfaces 140 connect to the network switch 400 through the data I/O network. The management interfaces 150 connect to the management computer 500 through the management network 600. It should be noted that the number of the data I/O interfaces 140 and the number of the management interfaces 150 are arbitrary. Also, it is not required to configure the data I/O interfaces 140 independently of the management interfaces 150, and management information may be inputted/outputted through the data I/O interfaces 140 and shared with the management interfaces 150.

The storage controller 190 is equipped with a processor that controls the storage subsystem 100. The data I/O cache memories 160 are temporary storage extents for accelerating input/output with respect to storage extents by the host computer 300. The data I/O cache memories 160 are generally configured using volatile memories but may be configured using nonvolatile memories or magnetic disk drives instead. It should be noted that there is no limitation on the number and capacities of the data I/O cache memories 160. The magnetic disk drives 120 store data that the host computer 300 reads/writes.

The program memory 1000 stores programs and control information that are necessary for processing carried out in the storage subsystem 100. The program memory 1000 is configured using a magnetic disk drive or a volatile semiconductor memory.

The program memory 1000 stores RAID group configuration information 1001, storage extent configuration information 1002, logical unit configuration information 1003, external storage map information 1004, virtual storage resource pool configuration information 1005, virtual storage unit configuration information 1006, data I/O interface configuration information 1007, management interface configuration information 1008, and a virtual storage unit management program 1009.

The RAID group configuration information 1001 stores correspondences between RAID groups and magnetic disk drives configuring the RAID groups. This will be described later with reference to FIG. 6.

The storage extent configuration information 1002 stores correspondences between logical storage extents and the RAID groups. This will be described later with reference to FIG. 7.

The logical unit configuration information 1003 stores correspondences among communication interfaces, storage units that are units of storage resources accessible from the host computer 300, and the logical storage extents. This will be described later with reference to FIG. 8.

The external storage map information 1004 stores correspondences among external storage extents, the communication interfaces, and the storage units. This will be described later with reference to FIG. 9. Each external storage extent is a storage extent of an external storage subsystem that is provided to the host computer 300 as a storage extent of the storage subsystem 100.

The virtual storage resource pool configuration information 1005 stores correspondences among virtual storage resource pools, virtual storage extents included in the virtual storage resource pools, and the storage extents. This will be described later with reference to FIG. 10. Each virtual storage extent is a virtual storage extent provided to the host computer 300 with a thin provisioning technique. Each virtual storage resource pool is configured by a plurality of virtual storage extents.

The virtual storage unit configuration information 1006 stores correspondences between virtual storage units and the virtual storage resource pools. This will be described later with reference to FIG. 11.

The data I/O interface configuration information 1007 stores information about the data I/O interfaces 140 with which the storage subsystem 100 is provided. This will be described later with reference to FIG. 12.

The management interface configuration information 1008 stores information about the management interfaces 150 with which the storage subsystem 100 is provided. This will be described later with reference to FIG. 13.

The virtual storage unit management program 1009 is a program that manages a configuration of a storage system configured with the virtual storage technique or the thin provisioning technique.

Figure 3:
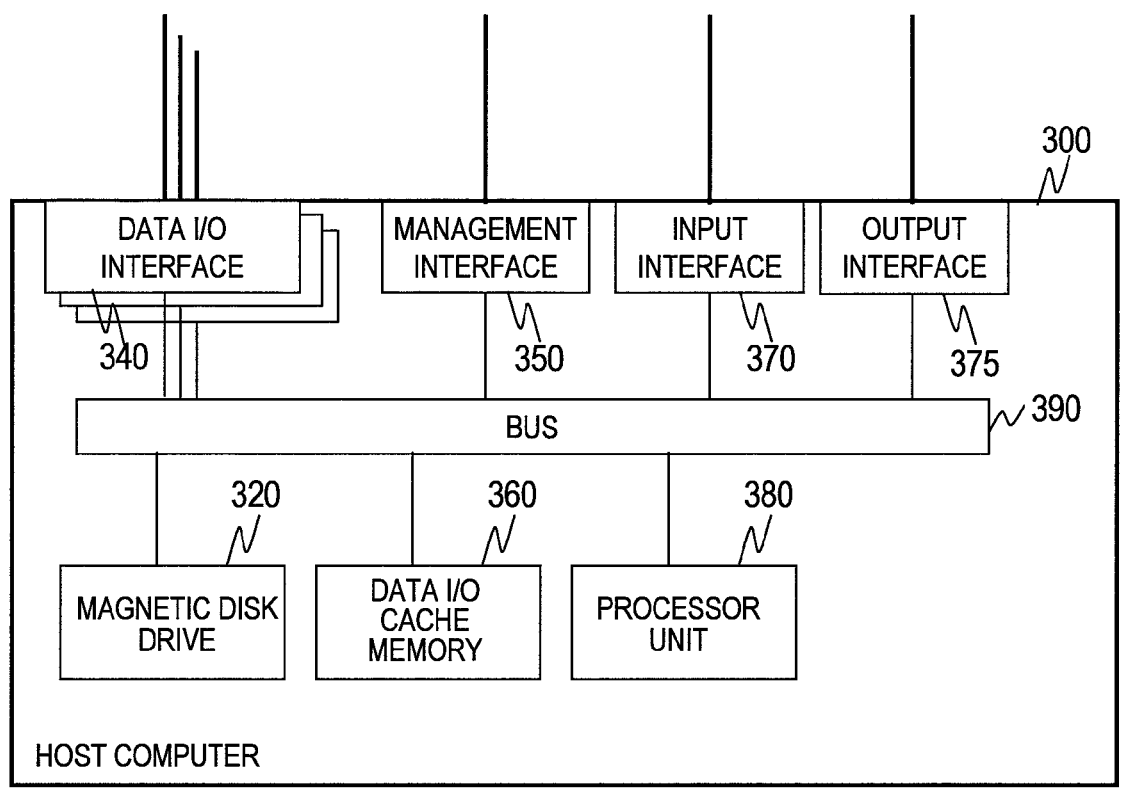
FIG. 3 is a block diagram showing a configuration of the host computer according to the embodiment of this invention.

FIG. 3 shows a configuration of the host computer 300 according to the embodiment of this invention. The host computer 300 includes data I/O interfaces 340, management interfaces 350, an input interface 370, an output interface 375, a processor unit 380, a magnetic disk drive 320, and data I/O cache memories 360.

The data I/O interfaces 340, the management interfaces 350, the input interface 370, the output interface 375, the processor unit 380, the magnetic disk drive 320, and the data I/O cache memories 360 are connected to one another through a communication bus 390. The host computer 300 has a hardware configuration achievable with a general-purpose computer (Personal Computer).

The data I/O interfaces 340 connect to the network switch 400 through the data I/O network and inputs/outputs data. The management interfaces 350 connect to the management computer 500 through the management network 600 and inputs/outputs management information. It should be noted that the number of the data I/O interfaces 340 and the number of the management interfaces 350 are arbitrary. Also, it is not required to configure the data I/O interfaces 340 independently of the management interfaces 350 and management information may be inputted/outputted through the data I/O interfaces 340 and shared with the management interfaces 350.

The input interface 370 connects to a device, such as a keyboard and a mouse, which is used by an operator to input information. The output interface 375 connects to a device, such as a general-purpose display, which outputs information for the operator. The processor unit 380 carries out various kinds of computations and corresponds to a CPU or a processor. The magnetic disk drive 320 stores software such as an operating system and applications.

The data I/O cache memories 360 are configured using volatile memories or the like and accelerate data input/output into/from the magnetic disk drive 320. The data I/O cache memories 360 are generally implemented using volatile memories but may be configured using nonvolatile memories or magnetic disk drives. It should be noted that there is no limitation on the number and capacities of the data I/O cache memories 360.

Figure 4:
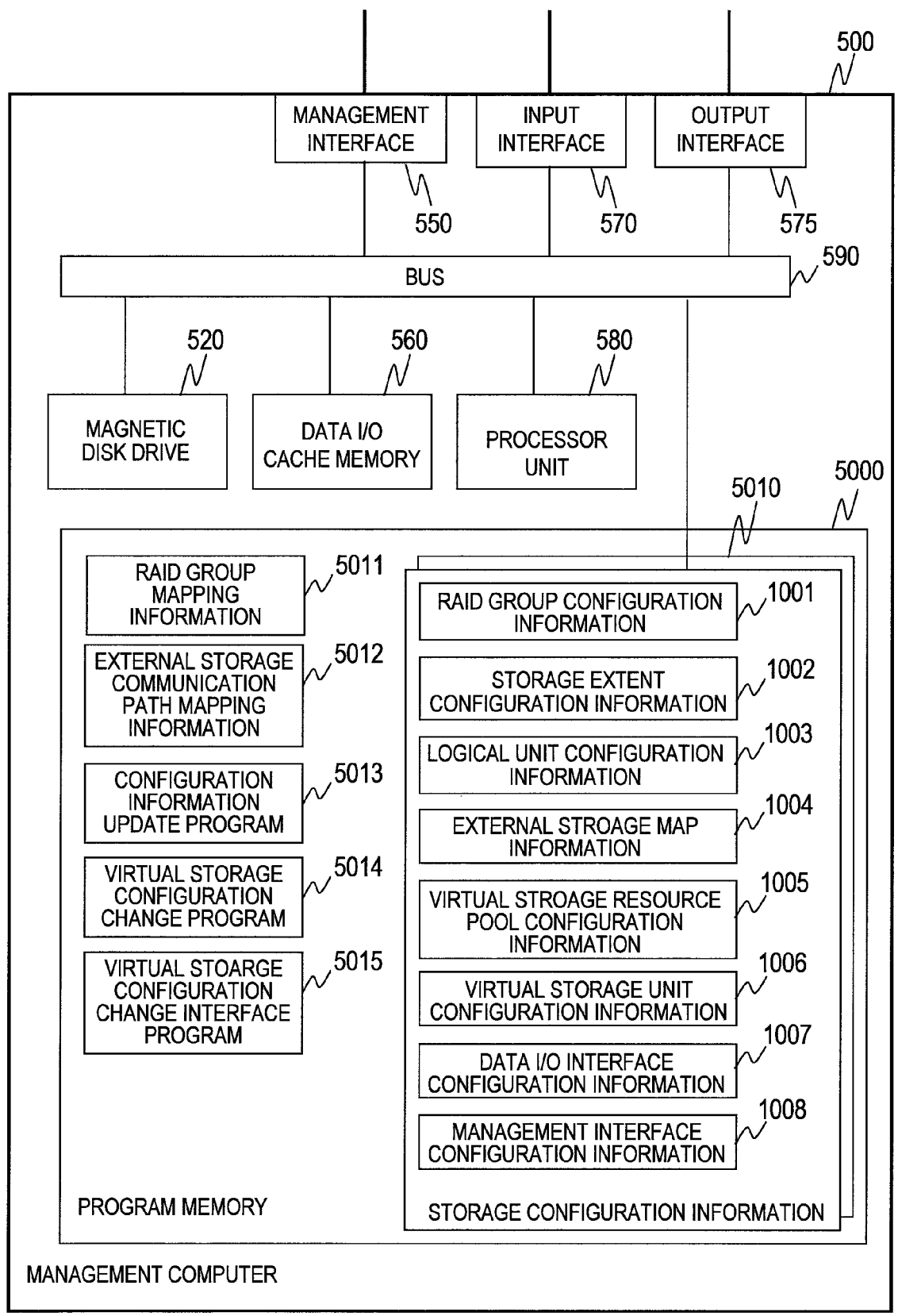
FIG. 4 is a block diagram showing a configuration of the management computer according to the embodiment of this invention.

FIG. 4 shows a configuration of the management computer 500 according to the embodiment of this invention. The management computer 500 includes a data I/O interface 540, a management interface 550, an input interface 570, an output interface 575, a processor unit 580, a magnetic disk drive 520, a program memory 5000, and a data I/O cache memory 560.

The data I/O interface 540, the management interface 550, the input interface 570, the output interface 575, the processor unit 580, the magnetic disk drive 520, the program memory 5000, and the data I/O cache memory 560 are connected to one another through a communication bus 590. The management computer 500 has a hardware configuration achievable with a general-purpose computer (PC) and the function of each portion is the same as that of the host computer shown in FIG. 3.

The program memory 5000 stores storage configuration information 5010, RAID group mapping information 5011, external storage communication path mapping information 5012, a configuration information update program 5013, a virtual storage configuration change program 5014, and a virtual storage configuration change interface program 5015.

The storage configuration information 5010 is a collection of control information that the storage subsystem 100 holds separately. Therefore, in the storage configuration information 5010, a plurality of pieces of control information, whose number is equal to the number of the storage subsystems 100 that are management targets, are recorded. Also, the RAID group configuration information 1001 and the like included in the storage configuration information 5010 are the same as the information stored in each storage subsystem 100.

The RAID group mapping information 5011 stores the numbers of virtual storage extents registered in RAID groups. This will be described later with reference to FIG. 14.

The external storage communication path mapping information 5012 stores the numbers of connection paths of external storage devices connected to the data I/O interfaces 140 of the storage subsystem 100. This will be described later with reference to FIG. 15.

The configuration information update program 5013 collects the control information from each storage subsystem 100 that is a management target and updates the storage configuration information 5010 at predetermined timings. The virtual storage configuration change program 5014 instructs the storage subsystem 100 to change the configuration of the virtual storage subsystem. The virtual storage configuration change interface program 5015 provides a user interface for instructing to change the configuration of the virtual storage subsystem.

Here, a storage system according to the embodiment of this invention, to which the virtual storage technique and the thin provisioning technique have been applied, will be described.

Figure 5:
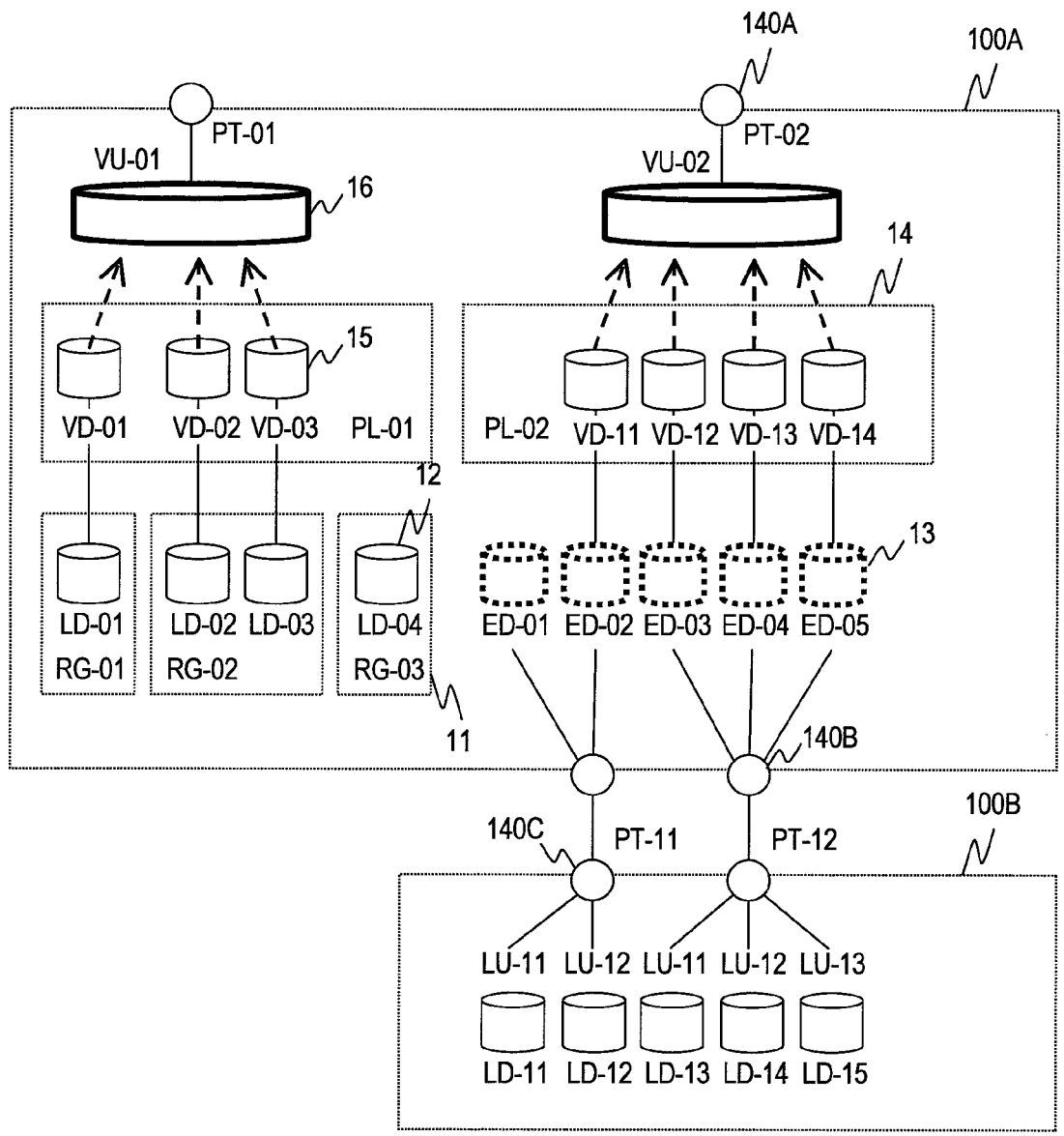
FIG. 5 is a diagram showing a logical configuration of the storage system according to the embodiment of this invention.

FIG. 5 shows a logical configuration of the storage system according to the embodiment of this invention. The storage system shown in FIG. 5 includes a storage subsystem 100A that is directly accessed by the host computer 300 and a connected external storage subsystem 100B that provides the storage subsystem 100A with external storage extents.

The storage subsystem 100A receives access from the host computer 300 through data I/O interfaces 140A. Also, the storage subsystem 100A connects with data I/O interfaces 140C of the external storage subsystem 100B through data I/O interfaces 140B.

The storage subsystem 100A stores RAID groups 11 (RG-01, RG-02, and RG-03). In the RAID groups 11, logical storage extents 12 are defined. For instance, in the RAID group "RG-02", logical storage extents "LD-02" and "LD-03" are defined.

Meanwhile, logical storage extents 12 (LD-11 to LD-15) provided by the external storage subsystem 100B are associated with storage units 17 (LU-11 and the like) of the data I/O interfaces 140 "PT-11" and "PT-12". The storage units 17 are associated with external storage extents 13 of the storage subsystem 100A.

Each virtual storage resource pool 14 includes virtual storage extents 15 (VD-01 to VD-03 or VD-11 to VD-14). Each virtual storage extent 15 is associated with a logical storage extent 12 or an external storage extent 13. Also, a virtual storage unit 16 (VU-01 or VU-02) is defined for each virtual storage resource pool 14. The virtual storage unit 16 is provided to the host computer 300 as storage extents through a corresponding data I/O interface 140A.

In the configuration shown in FIG. 5, the virtual storage extents 15 "VD-02" and "VD-03" configuring the virtual storage resource pool "PL-01" belong to the same RAID group but are registered as different virtual storage extents 15. In this case, the virtual storage unit management program 1009 equally allocates the virtual storage extents "VD-01", "VD-02", and "VD-03". Therefore, actually allocated hardware resources are concentrated on the RAID group "RG-02". In this case, there arises a problem that a load is not distributed as expected.

In addition, when the storage controller 190 of the storage subsystem 100 distributes a load by equally allocating the virtual storage extents "VD-11", "VD-12", "VD-13", and "VD-14" configuring the virtual storage resource pool "PL-02" through execution of the virtual storage unit management program 1009, the data I/O interface 140 "PT-11" on an external storage subsystem 100B side has only one path that is a path to "LD-12" but the data I/O interface 140 "PT-12" has three paths that are paths to "LD-13", "LD-14", and "LD-15", so the load is concentrated on "PT-12". Therefore, there arises a problem that the load is not distributed as expected.

Next, control information corresponding to the storage system shown in FIG. 5 and stored in the storage subsystem 100 and the management computer 500 will be described.

FIG. 6 shows an example of a configuration of the RAID group configuration information 1001 stored in the storage subsystem 100 according to the embodiment of this invention. As described above, the RAID group configuration information 1001 stores correspondences between the RAID groups and the magnetic disk drives configuring the RAID groups.

The RAID group configuration information 1001 includes RAID group identification information 10011 and magnetic disk drive identification information 10012.

The RAID group identification information 10011 is identifiers that uniquely identify the RAID groups 11 configured in the storage subsystem 100. The magnetic disk drive identification information 10012 is identifiers that uniquely identify the magnetic disk drives 120 configuring the RAID groups 11 identified by the RAID group identification information 10011. For instance, the RAID group "RG-01" is configured by the magnetic disk drives "HD-01", "HD-02", "HD-03", and "HD-04".

FIG. 7 shows an example of a configuration of the storage extent configuration information 1002 stored in the storage subsystem 100 according to the embodiment of this invention. As described above, the storage extent configuration information 1002 stores correspondences between the logical storage extents and the RAID groups. The storage extent configuration information 1002 includes storage extent identification information 10021 and RAID group identification information 10022.

The storage extent identification information 10021 is identifiers that uniquely identify the logical storage extents 12 provided by the storage subsystem 100. The RAID group identification information 10022 is identifiers that uniquely identify the RAID groups 11 that provide the logical storage extents 12.

FIG. 8A and FIG. 8B each show an example of a configuration of the logical unit configuration information 1003 stored in the storage subsystem 100 according to the embodiment of this invention. As described above, the logical unit configuration information 1003 stores correspondences between the communication interfaces, the storage units that are units of the storage resources accessible from the host computer 300, and the storage extents.

The logical unit configuration information 1003 includes communication interface identification information 10031, storage unit identification information 10032, and storage extent identification information 10033.

The communication interface identification information 10031 is identifiers that uniquely identify the data I/O interfaces 140. The storage unit identification information 10032 is identifiers that uniquely identify the storage units. As described above, the storage units are units of the storage resources accessible from the host computer 300 connected to the storage subsystem 100 and correspond to volumes mounted to a file system that the host computer 300 operates. The storage extent identification information 10033 is identifiers that uniquely identify the logical storage extents 12 provided by the storage subsystem 100.

FIG. 8A shows the logical unit configuration information 1003A stored in the storage subsystem 100 according to the embodiment of this invention in the case where the storage units identified by the storage unit identification information 10032 are virtual storage units. In this case, it is impossible to directly identify storage extents corresponding to logical units, so it is not required to record values in the storage extent identification information 10033.

FIG. 8B shows the logical unit configuration information 1003B stored in the storage subsystem 100 according to the embodiment of this invention in the case where the storage units identified by the storage unit identification information 10032 are provided in the storage subsystem 100.

FIG. 9 shows an example of a configuration of the external storage map information 1004 stored in the storage subsystem 100 according to the embodiment of this invention. The external storage map information 1004 includes external storage extent identification information 10041, communication interface identification information 10042, and storage unit identification information 10043.

The external storage extent identification information 10041 is identifiers that uniquely identify the external storage extents 13. The communication interface identification information 10042 is identifiers that uniquely identify the data I/O interfaces 140. The storage unit identification information 10043 is identifiers that uniquely identify the storage units.

The external storage extents 13 are virtual storage extents that are not actually equipped for the storage subsystem 100, as described above. Therefore, requests for input/output into/from the external storage extents 13 are transferred to the storage units stored in the externally connected storage subsystem through the data I/O interfaces 140.

Also, when a data I/O interface 140 and a storage unit are identified, it is possible to identify a storage extent, in which data is stored, based on the logical unit configuration information 1003B shown in FIG. 8B. Therefore, the external storage map information 1004 stores correspondences between the identifiers of the external storage extents and the storage extents.

FIG. 10 shows an example of a configuration of the virtual storage resource pool configuration information 1005 stored in the storage subsystem 100 according to the embodiment of this invention.

The virtual storage resource pool configuration information 1005 includes virtual storage resource pool identification information 10051, virtual storage extent identification information 10052, and storage extent identification information 10053.

The virtual storage resource pool identification information 10051 is identifiers that uniquely identify the virtual storage resource pools 14. In each virtual storage resource pool, a plurality of virtual storage extents are registered.

The virtual storage extent identification information 10052 is identifiers that uniquely identify the virtual storage extents 15 included in the virtual storage resource pools 14.

The storage extent identification information 10053 is identifiers that uniquely identify the storage extents corresponding to the virtual storage extents 15 identified by the virtual storage extent identification information 10052. There are a case where the storage extent identification information 10053 is associated with the logical storage extents 12 provided by the storage subsystem 100 and a case where the storage extent identification information 10053 is associated with the external storage extents 13.

FIG. 11 shows an example of a configuration of the virtual storage unit configuration information 1006 stored in the storage subsystem 100 according to the embodiment of this invention. The virtual storage unit configuration information 1006 defines the virtual storage units 16 included in the virtual storage resource pools 14.

The virtual storage units 16 are virtual storage units operated by the virtual storage unit management program 1009 stored in the storage subsystem 100 and are dynamically allocated with physical storage resources from the storage extents registered in the virtual storage resource pools 14.

The virtual storage unit configuration information 1006 includes virtual storage unit identification information 10061 and virtual storage resource pool identification information 10062.

The virtual storage unit identification information 10061 is identifiers that uniquely identify the virtual storage units 16. The virtual storage resource pool identification information 10062 is identifiers that uniquely identify the virtual storage resource pools 14.

FIG. 12 shows an example of a configuration of the data I/O interface configuration information 1007 stored in the storage subsystem 100 according to the embodiment of this invention.

The data I/O interface configuration information 1007 includes data I/O interface identification information 10071, communication interface bandwidths 10072, and storage subsystem identification names 10073.

The storage subsystem identification names 10073 are identification names that uniquely identify the storage subsystems 100. The data I/O interface identification information 10071 is identifiers that uniquely identify the data I/O interfaces 140. The communication interface bandwidths 10072 are bandwidths of the data I/O interfaces 140.

FIG. 13 shows an example of a configuration of the management interface configuration information 1008 stored in the storage subsystem 100 according to the embodiment of this invention.

The management interface configuration information 1008 includes storage subsystem identification names 10081 and management interface identification information 10082.

The storage subsystem identification names 10081 are identification names that uniquely identify the storage subsystems 100. The management interface identification information 10082 stores information that identifies the management interfaces 150 provided for the storage subsystems 100. In the management interface configuration information 1008 shown in FIG. 13, IP addresses of the management interfaces 150 are recorded as the management interface identification information 10082.

FIG. 14 shows an example of a configuration of the RAID group mapping information 5011 stored in the management computer 500 according to the embodiment of this invention.

The RAID group mapping information 5011 includes RAID group identification information 50111 and virtual storage extent registration numbers 50112.

The RAID group identification information 50111 is identifiers that uniquely identify the RAID groups 11. The virtual storage extent registration numbers 50112 are the numbers of the virtual storage extents 15, out of the logical storage extents 12 stored in the RAID groups 11, which are registered in the virtual storage resource pools 14.

FIG. 15 shows an example of a configuration of the external storage communication path mapping information 5012 stored in the management computer 500 according to the embodiment of this invention.

The external storage communication path mapping information 5012 includes communication interface identification information 50121, communication interface bandwidths 50122, and external storage extent connection path numbers 50123.

The communication interface identification information 50121 is identifiers that uniquely identify the data I/O interfaces 140. The communication interface bandwidths 50122 store communication performance of the data I/O interfaces 140. The external storage extent connection path numbers 50123 store the numbers of the storage units, out of the storage units connected to the data I/O interfaces 140, which are provided as the external storage extents 13.

The control information stored in the storage subsystem 100 and the management computer 500 are described above. Hereinafter, processing carried out in the storage subsystem 100 and the management computer 500 in the embodiment of this invention will be described.

Figure 16:
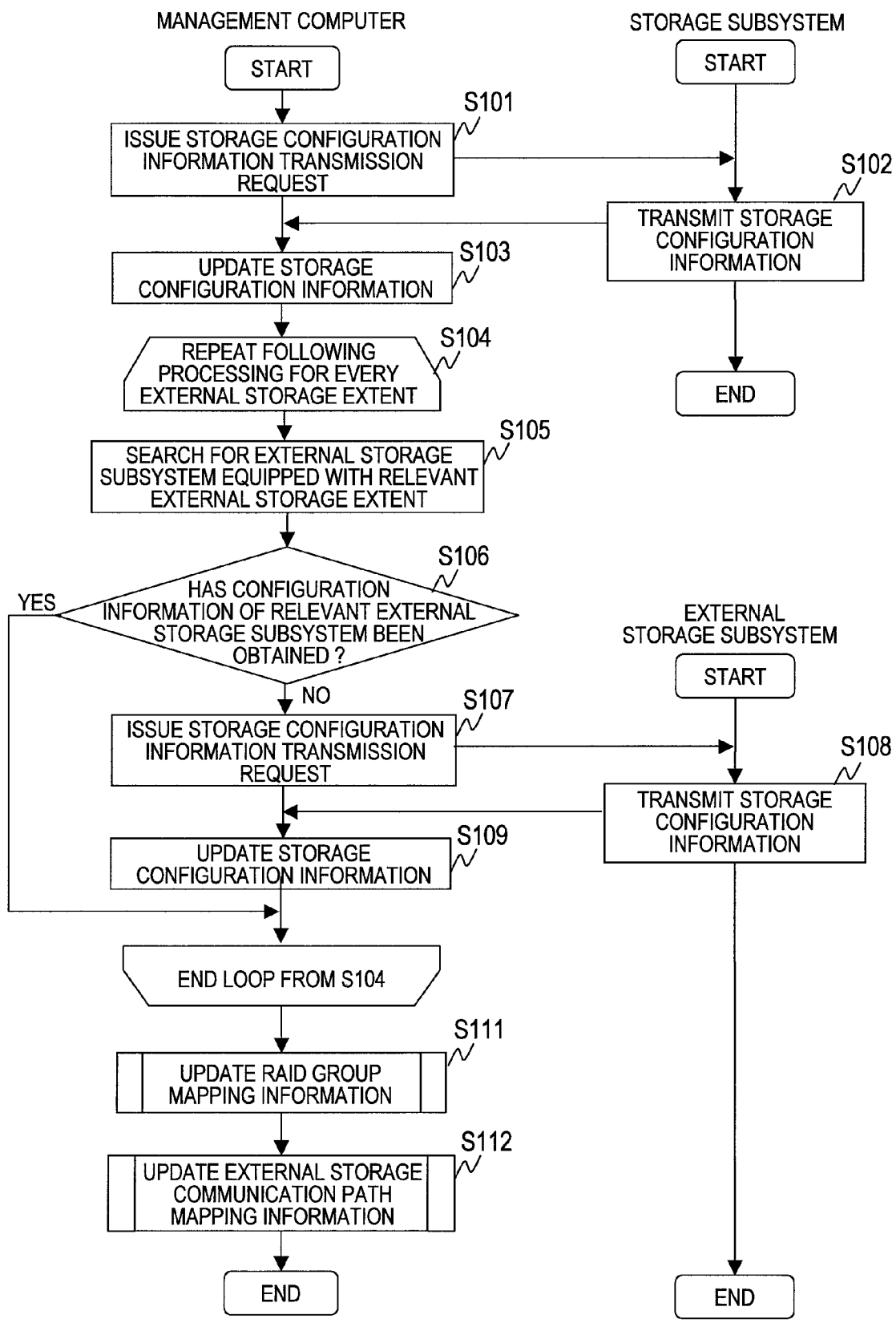
FIG. 16 is a flowchart showing a procedure of processing for updating the storage configuration information held in the management computer according to the embodiment of this invention.

FIG. 16 is a flowchart showing a procedure of processing for updating the storage configuration information held in the management computer 500 according to the embodiment of this invention. The storage configuration information held in the management computer 500 is updated at predetermined timings through execution of the configuration information update program 5013 by the processor unit 580 of the management computer 500.

The processor unit 580 of the management computer 500 issues a storage configuration information transmission request message to the storage subsystem 100 managed by the management computer 500 (S101).

Upon receiving the storage configuration information transmission request from the management computer 500, the storage controller 190 of the storage subsystem 100 transmits every piece of configuration information stored in the program memory 1000 (S102).

Upon receiving the storage configuration information from the storage subsystem 100, the processor unit 580 of the management computer 500 updates the storage configuration information stored in the program memory 5000 (S103).

Next, the processor unit 580 of the management computer 500 carries out the following processing for every external storage extent recorded in the external storage extent identification information 10041 of the external storage map information 1004 (S104).

The processor unit 580 of the management computer 500 first searches for an external storage subsystem equipped with an external storage extent that is a processing target (S105). More specifically, first, the processor unit 580 of the management computer 500 obtains a data I/O interface 140 recorded for the processing target external storage extent in the communication interface identification information 10042 of the external storage map information 1004. Next, the processor unit 580 of the management computer 500 obtains a record coinciding with the obtained data I/O interface 140 from the data I/O interface configuration information 1007 based on the obtained data I/O interface 140. Then, the processor unit 580 of the management computer 500 stores a storage subsystem identification name 10073 in the obtained record in the program memory 5000.

The processor unit 580 of the management computer 500 judges whether configuration information of the storage subsystem 100 found as a result of the processing of Step S105 has been obtained (S106). When the configuration information is yet to be obtained (result of the judgment in Step S106 is "No"), the processor unit 580 of the management computer 500 proceeds to processing of Step S107.

The processor unit 580 of the management computer 500 obtains a corresponding management interface 150 communication address recorded in the management interface identification information 10082 of the management interface configuration information 1008. Then, the processor unit 580 of the management computer 500 issues a storage configuration information transmission request message to the external storage subsystem having the communication address like in the processing of Step S101 (S107).

Upon receiving the storage configuration information transmission request, the storage controller 190 of the external storage subsystem transmits every piece of configuration information stored in the program memory 1000 (S108).

Upon receiving the storage configuration information, the processor unit 580 of the management computer 500 updates the storage configuration information stored in the program memory 5000 (S109). In addition, the processor unit 580 of the management computer 500 stores the identification name of the storage subsystem 100 in the memory and stores that the configuration information of the storage subsystem 100 has been obtained.

When the configuration information obtainment and update processing described above has been completed, the processor unit 580 of the management computer 500 recalculates the RAID group mapping information 5011 (S111). In a like manner, the processor unit 580 of the management computer 500 recalculates the external storage communication path mapping information 5012 (S112). It should be noted that the detailed procedure of the processing of Step S111 will be described below with reference to FIG. 17 and the detailed procedure of the processing of Step S112 will be described below with reference to FIG. 18.

Figure 17:
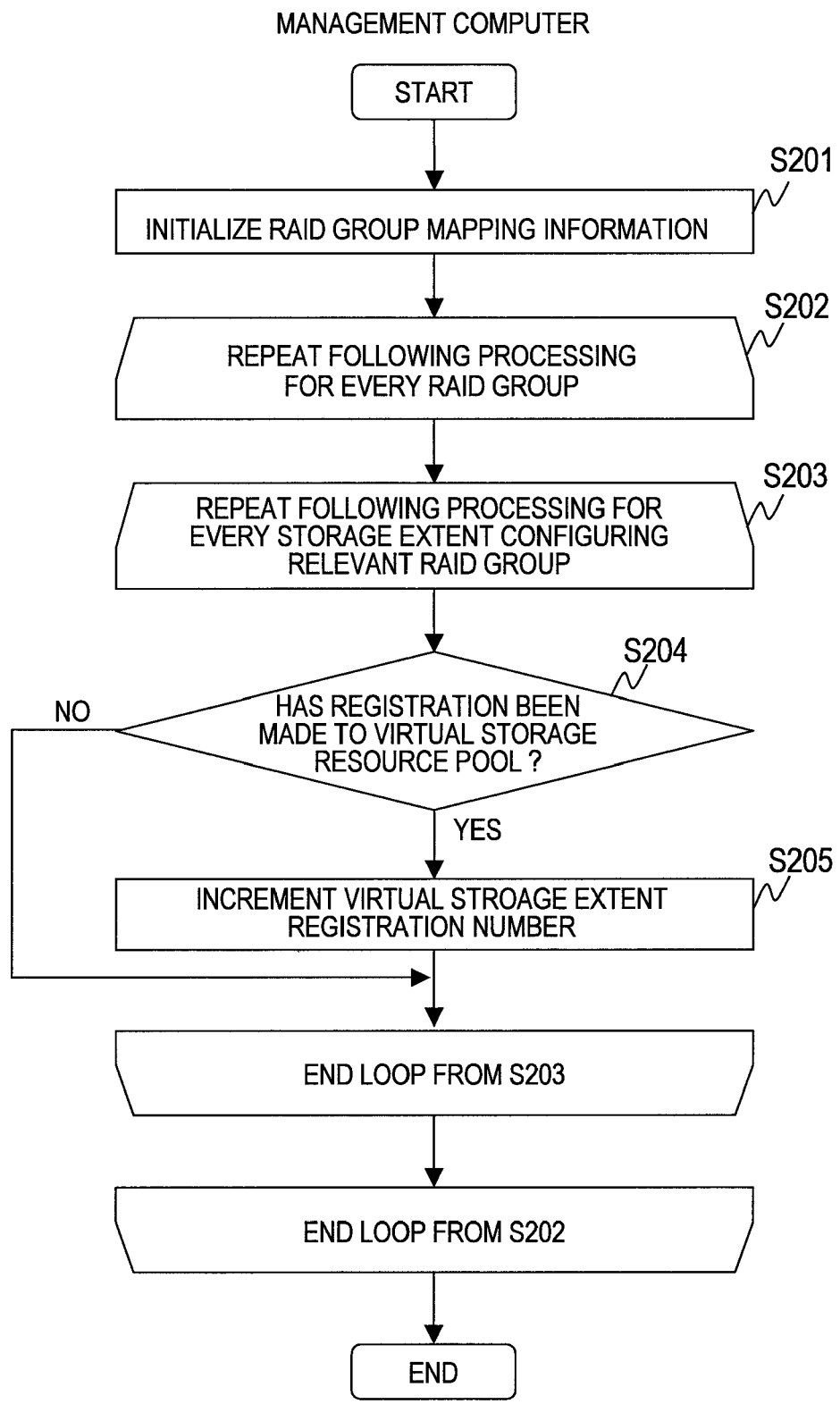
FIG. 17 is a flowchart showing a procedure of processing for updating the RAID group mapping information according to the embodiment of this invention.

FIG. 17 is a flowchart showing a procedure of processing for updating the RAID group mapping information 5011 according to the embodiment of this invention.

The processor unit 580 of the management computer 500 first performs initialization by deleting every piece of information recorded in the RAID group mapping information 5011 (S201).

The processor unit 580 of the management computer 500 repeats the following processing for every RAID group 11 stored in the RAID group identification information 10011 of the RAID group configuration information 1001 (S202).

The processor unit 580 of the management computer 500 repeats the following processing for the RAID groups 11 recorded in the RAID group identification information 10022 of the storage extent configuration information 1002 (S203).

The processor unit 580 of the management computer 500 judges whether a storage extent recorded in the storage extent identification information 10021 for a processing target RAID group 11 is recorded in the storage extent identification information 10053 of the virtual storage resource pool configuration information 1005 (S204). When the storage extent is registered in a virtual storage resource pool 14 (result of the judgment in Step S204 is "Yes"), the processor unit 580 of the management computer 500 adds "1" to a corresponding virtual storage extent registration number 50112.

Figure 18:
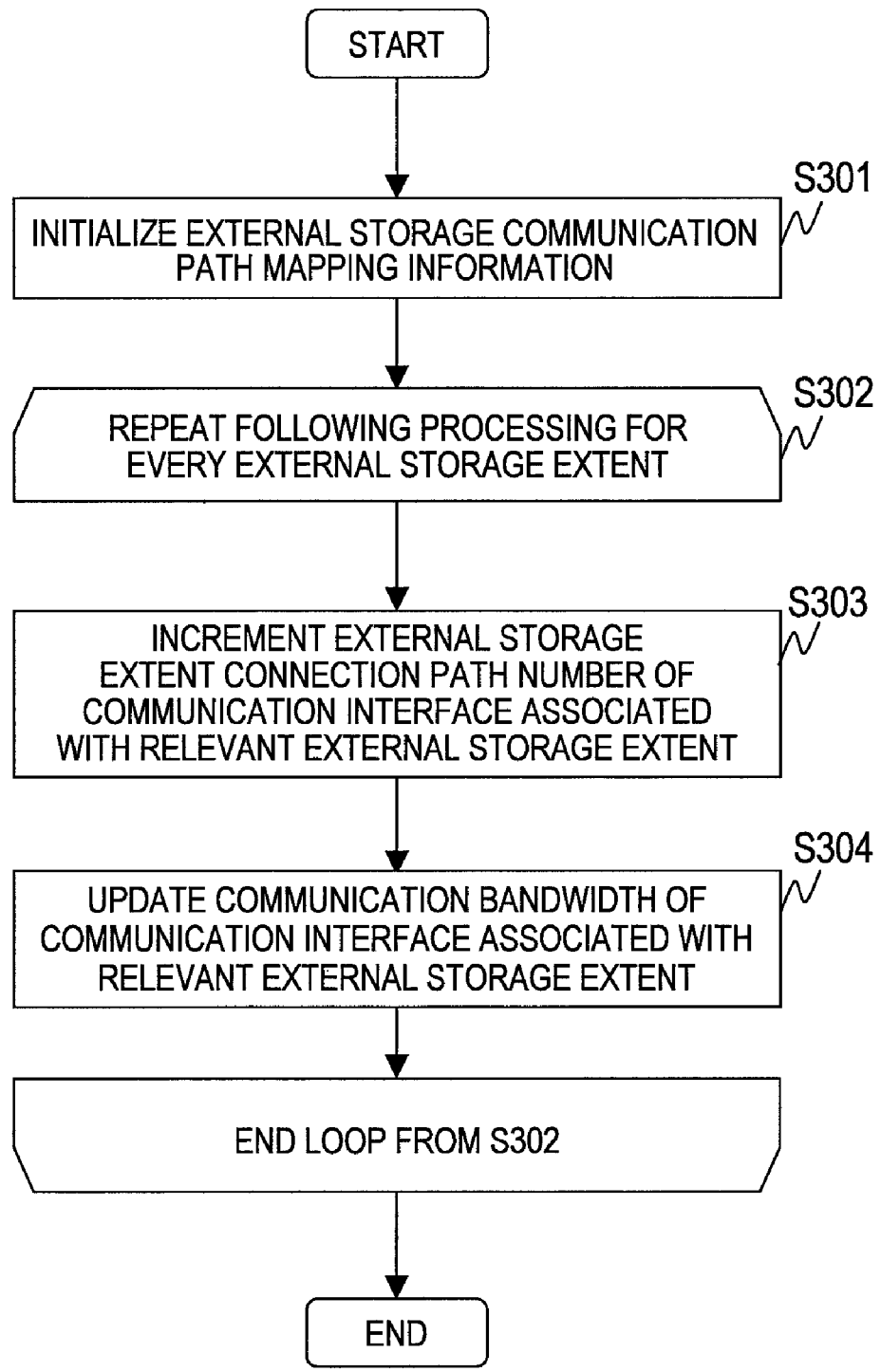
FIG. 18 is a flowchart showing a procedure of processing for updating the external storage communication path mapping information according to the embodiment of this invention.

FIG. 18 is a flowchart showing a procedure of processing for updating the external storage communication path mapping information 5012 according to the embodiment of this invention.

The processor unit 580 of the management computer 500 performs initialization by deleting every piece of information recorded in the external storage communication path mapping information 5012 (S301).

The processor unit 580 of the management computer 500 carries out the following processing for every external storage extent recorded in the external storage extent identification information 10041 of the external storage map information 1004 (S302).

The processor unit 580 of the management computer 500 adds "1" to an external storage extent connection path number 50123 of a data I/O interface 140 recorded in the communication interface identification information 10042 of the external storage map information 1004 (S303).

The processor unit 580 of the management computer 500 further searches the data I/O interface configuration information 1007 and obtains a bandwidth of the corresponding data I/O interface 140. Then, the processor unit 580 of the management computer 500 stores the obtained performance value as a communication interface bandwidth 50122 (S304).

Figure 19:
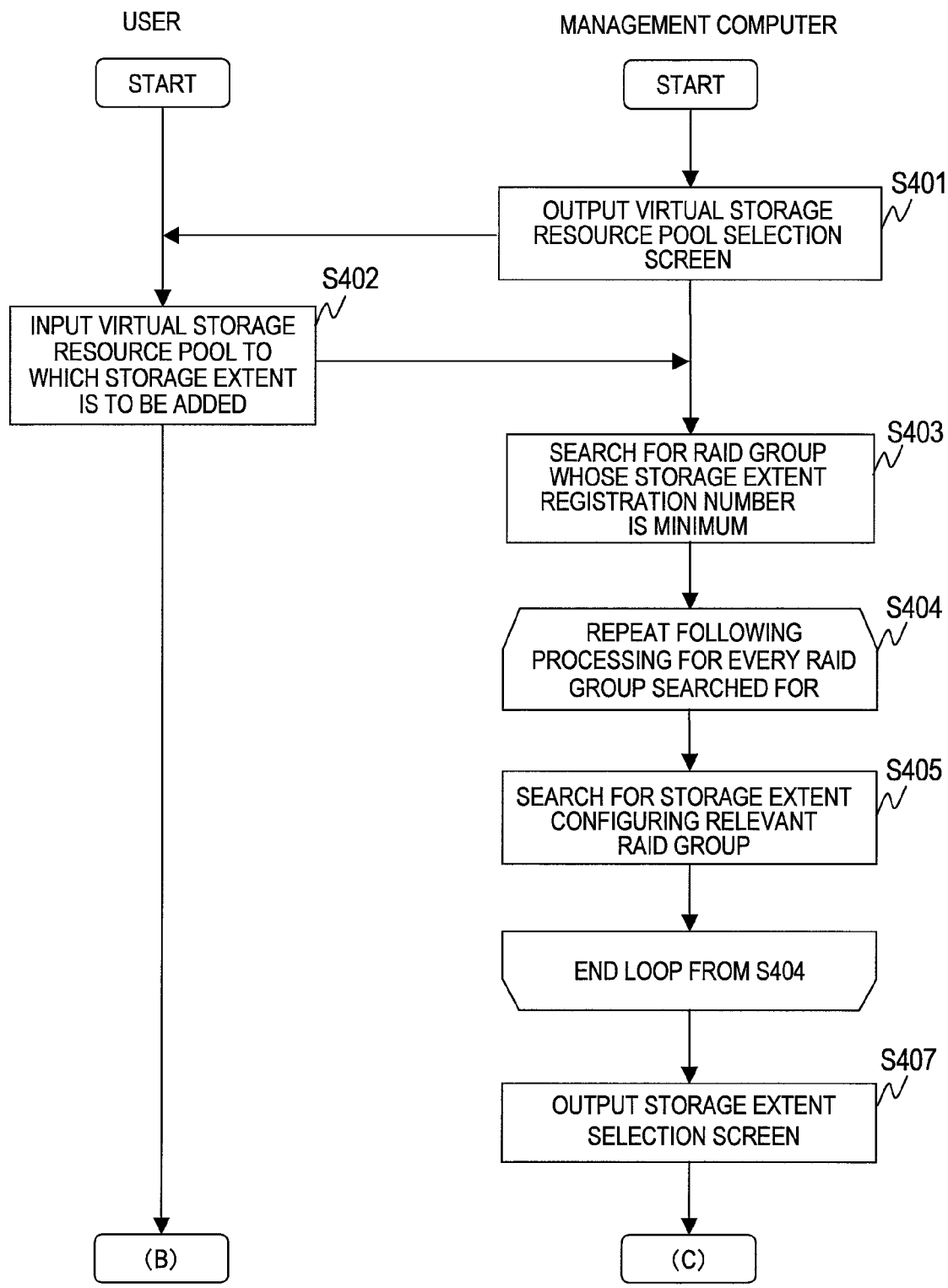
FIG. 19 is flowchart showing a former half portion of processing for additionally registering a new storage extent in a virtual storage resource pool according to the embodiment of this invention.
Figure 20:
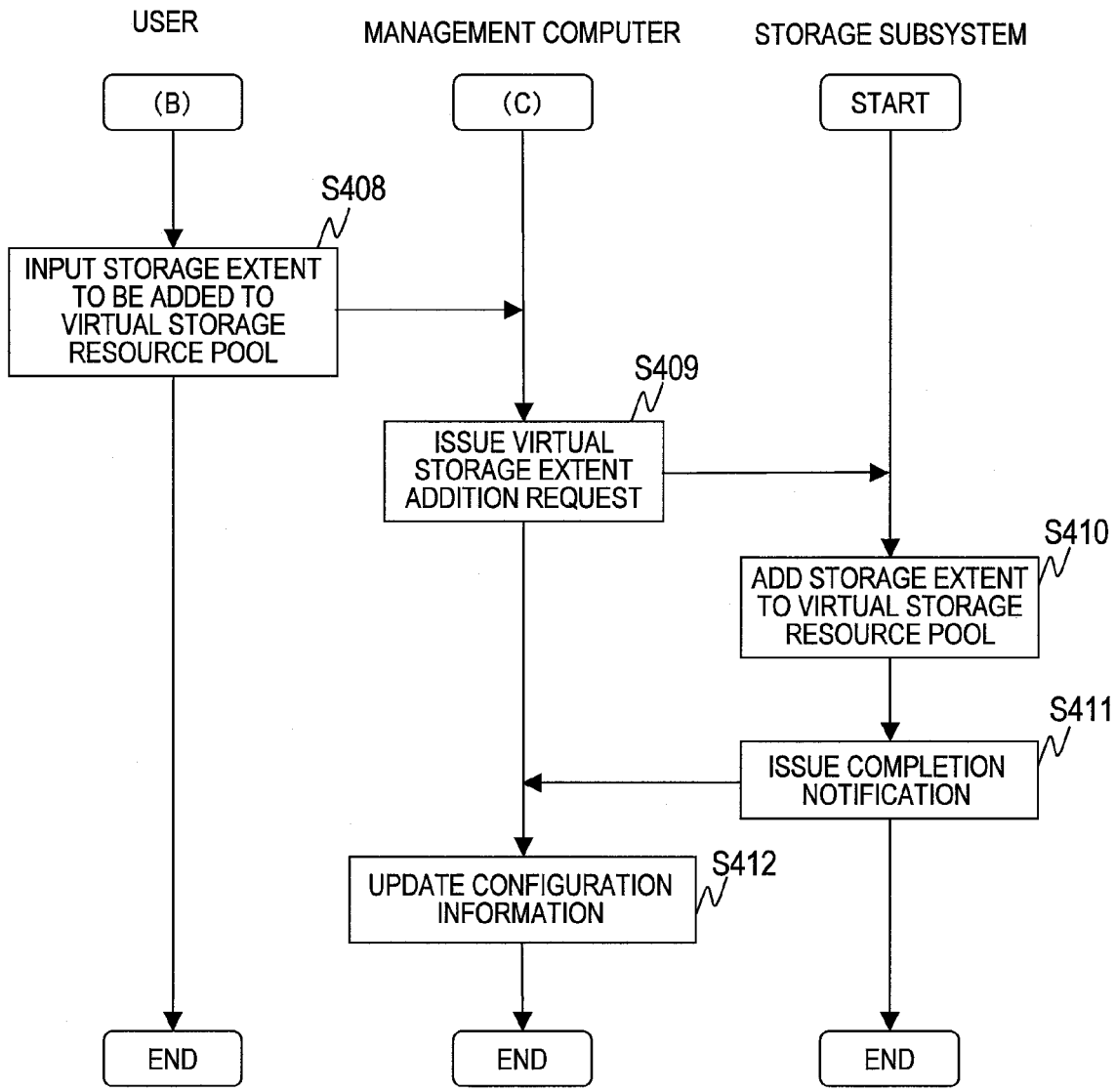
FIG. 20 is flowchart showing a latter half portion of processing for additionally registering a new storage extent in a virtual storage resource pool according to the embodiment of this invention.

FIG. 19 and FIG. 20 are flowcharts showing a procedure of processing for additionally registering a new storage extent in a virtual storage resource pool 14 according to the embodiment of this invention. In this processing, the processor unit 580 of the management computer 500 newly adds a virtual storage extent 15 to a virtual storage resource pool 14 and allocates a storage extent provided by a RAID group 11. In this case, in order to distribute loads of input/output processing on the RAID groups 11, the processor unit 580 of the management computer 500 selects a RAID group with a less number of storage extents allocated to the virtual storage resource pool 14. By selecting the storage extent in this manner, it becomes possible to equally distribute access among the respective RAID groups. It should be noted that the storage extent may be selected by giving consideration to performance of a magnetic disk drive that provides the storage extent.

The processor unit 580 of the management computer 500 outputs an interface for receiving an operation to add a virtual storage extent to the output interface 575 by executing the virtual storage configuration change interface program 5015 (S401). The interface for receiving the virtual storage extent addition operation will be described later with reference to FIG. 21.

The processor unit 580 of the management computer 500 receives input of a virtual storage resource pool 14, to which a virtual storage extent is to be registered, from a user through the interface for receiving the virtual storage extent addition operation (S402).

The processor unit 580 of the management computer 500 searches for every RAID group 11, whose virtual storage extent registration number 50112 coincides with the minimum value, by referring to the RAID group mapping information 5011 through execution of the virtual storage configuration change program 5014 (S403). In the processing of Step S403, when the minimum value of the virtual storage extent registration numbers 50112 is "0", for instance, the processor unit 580 of the management computer 500 obtains every RAID group whose value in the field coincides with "0".

The processor unit 580 of the management computer 500 carries out the following processing for every RAID group 11 found as a result of the processing of Step S403 (S404).

The processor unit 580 of the management computer 500 searches the storage extent configuration information 1002 and obtains every storage extent written in an entry whose RAID group 11 recorded in the RAID group identification information 10022 coincides with a processing target RAID group 11 (S405).

The processor unit 580 of the management computer 500 outputs every storage extent obtained through the processing described above to the virtual storage extent addition operation receiving interface by executing the virtual storage configuration change interface program 5015 (S407).

The processor unit 580 of the management computer 500 receives input of a storage extent to be added to the virtual storage resource pool 14 selected by the user in the processing of Step S402 through the interface (S408). At least one of the storage extents listed in the interface is selected as the storage extent to be added.

The processor unit 580 of the management computer 500 transmits a virtual storage extent addition request message to a storage subsystem 100 whose storage extent is to be added (S409). The virtual storage extent addition request message includes information about the addition target virtual storage resource pool 14 and the storage extent to be registered in the virtual storage resource pool 14.

Upon receiving the virtual storage extent addition request message, the storage controller 190 of the storage subsystem 100 associates the virtual storage extent identification information 10052 with the selected storage extent. In addition, the storage controller 190 of the storage subsystem 100 updates the virtual storage resource pool configuration information 1005 in order to register the selected storage extent in the selected virtual storage resource pool 14 (S410). For instance, when it is requested to register the storage extent "ED-05" in the virtual storage resource pool "PL-02", the storage controller 190 of the storage subsystem 100 associates the storage extent "ED-05" with the virtual storage extent "VD-14", generates a record whose contents correspond to this association, and records the generated record in the virtual storage resource pool configuration information 1005.

When the processing of Step S410 is completed, the storage controller 190 of the storage subsystem 100 transmits a completion notification message corresponding to the virtual storage extent addition request message (S411).

Upon receiving the completion notification message, the processor unit 580 of the management computer 500 updates the virtual storage resource pool configuration information 1005 in a like manner (S412).

Figure 21:
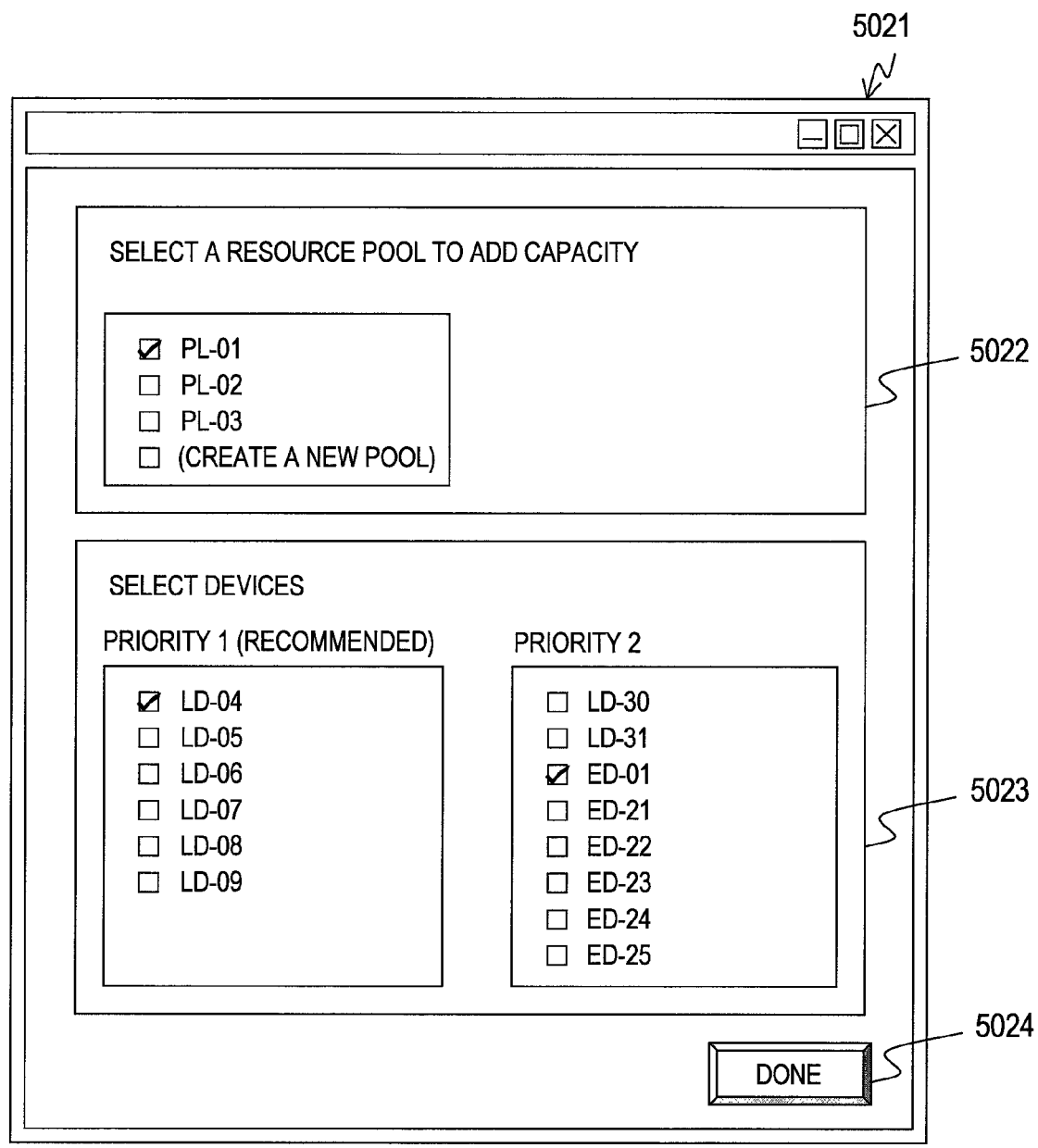
FIG. 21 is a configuration diagram showing a storage extent selection screen that is an example of the virtual storage extent addition operation receiving interface provided by the virtual storage configuration change interface program according to the embodiment of this invention.

FIG. 21 shows a storage extent selection screen 5021 that is an example of the virtual storage extent addition operation receiving interface provided by the virtual storage configuration change interface program 5015 according to the embodiment of this invention.

The storage extent selection screen 5021 includes an area 5022 in which a virtual storage resource pool 14 is selected, an area 5023 in which a storage extent 12 is selected, and a done button 5024.

The area 5022 includes check boxes for selection from among already-existing virtual storage resource pools 14 and a check box for selection of creation of a new virtual storage resource pool. The area 5023 includes check boxes for selection from among storage extents that can be added. The check boxes are checked by an input from an input device such as a pointing device. In addition, by an input of selection of the done button 5024, the processor unit 580 performs processing for adding a storage extent selected in the area 5023 to a virtual storage resource pool corresponding to a check box selected in the area 5022.

The area 5022 receives selection from among already-existing virtual storage resource pools 14 and receives an instruction to newly create a virtual storage resource pool 14. The area 5023 displays a list of storage extents that can be added. More specifically, in the area 5023, storage extents, with which load equalization is achieved, are displayed as storage extents in a first priority group (Priority 1). On the other hand, storage extents that have less effect of the load equalization but can be added are displayed as storage extents in a second priority group (Priority 2). For instance, the storage extent found as a result of the processing of Step S405 is displayed in the first priority group. With the storage extent selection screen 5021 displayed in this manner, it becomes possible for an operator to easily select a storage extent from the candidate list so that a load is not concentrated on a specific RAID group or data I/O interface 140.

The storage extent selection screen 5021 starts to be displayed in the processing of Step S401 shown in FIG. 19. The processor unit 580 of the management computer 500 receives selection of a virtual storage resource pool 14 to which a storage extent 12 is to be added (S402 in FIG. 19). Before the selection of the virtual storage resource pool 14, it is impossible to designate priorities of storage extents to be added, so the area 5023 is not displayed or is displayed under a selection impossible state.

Upon receiving the selection of the virtual storage resource pool 14, the processor unit 580 of the management computer 500 extracts storage extents that are addition targets for the selected virtual storage resource pool 14. Then, in the processing of Step S407, the processor unit 580 of the management computer 500 displays the area 5023 of the storage extent selection screen 5021 or sets the area 5023 under a selection possible state and displays the storage extents that can be added.

It should be noted here that the screen displayed in the processing of Step S401 and the screen displayed in the processing of Step S407 may be the same as described above or may be different screens.

Figure 22:
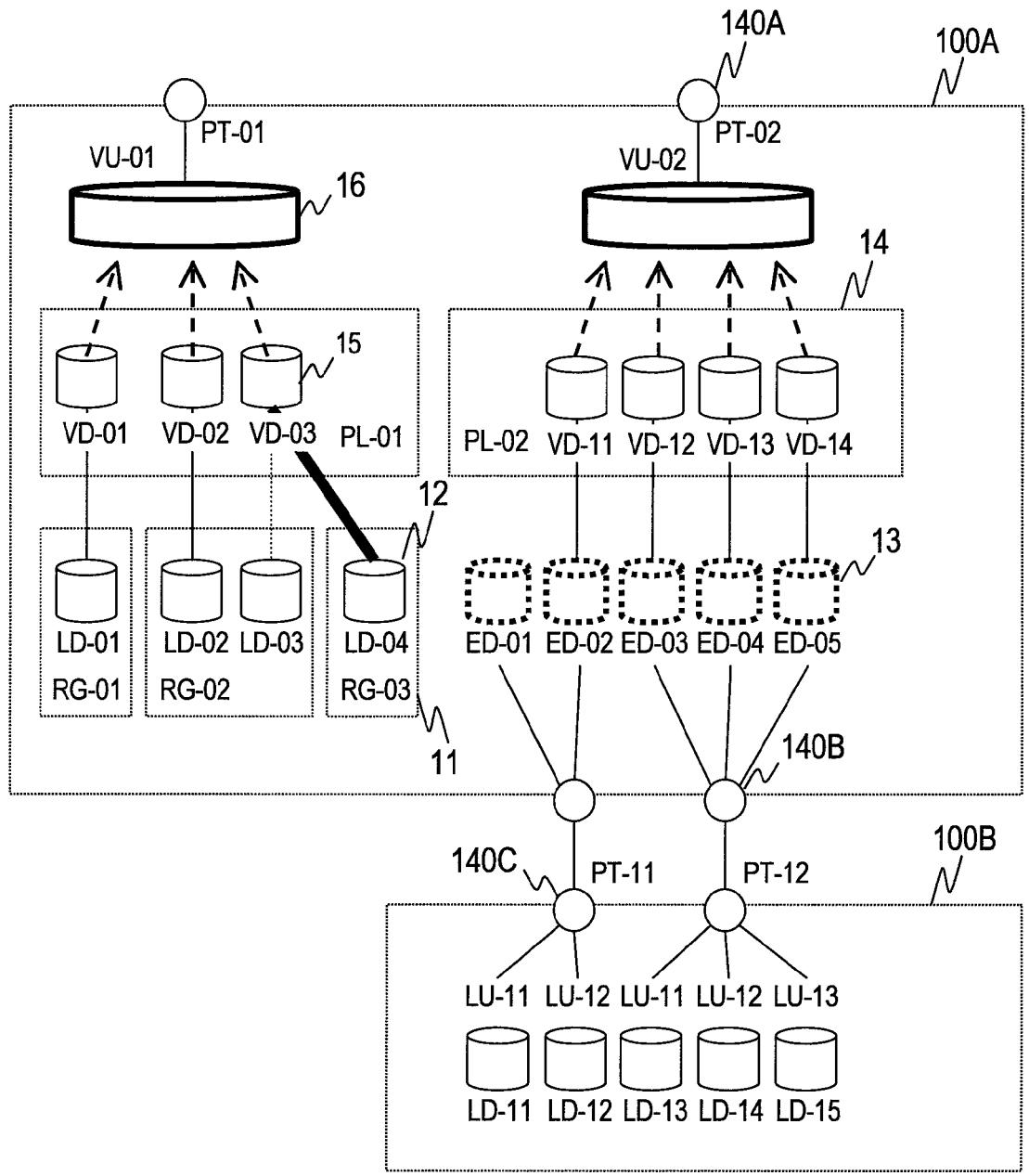
FIG. 22 is a diagram showing a logical configuration in which a load is distributed through the virtual storage extent selection and addition processing according to the embodiment of this invention.

FIG. 22 shows a configuration in which a load is distributed through the virtual storage extent 15 selection and addition processing according to the embodiment of this invention.

Referring to FIG. 5, as described above, in spite of the fact that the storage extents "LD-02" and "LD-03" are included in the same RAID group, they are registered as different virtual storage extents "VD-02" and "VD-03" in the virtual storage resource pool "PL-01". Therefore, there is a fear that an input/output load will be concentrated on "RG-02".

On the other hand, according to the embodiment of this invention, a storage extent belonging to a RAID group, whose storage extent registration number is minimum, is allocated through the processing of Step S403 in FIG. 19. Therefore, at a point when the virtual storage extents "VD-01" and "VD-02" are registered in FIG. 5, when the virtual storage extent 15 "VD-03" is newly added, it becomes possible to associate not the storage extent "LD-03" (dotted line in FIG. 22) but the storage extent "LD-04" (thick line in FIG. 22) belonging to a different RAID group with the virtual storage extent "VD-03". By selecting the storage extent to be registered in the virtual storage resource pool 14 in this manner, it becomes possible to avoid a situation in which performance is degraded due to concentration of a load on the specific RAID group "RG-02".

According to the embodiment of this invention, when a storage extent is added to a virtual storage resource pool 14, it becomes possible to present storage extents configuring RAID groups 11, whose numbers of storage extents registered in the virtual storage resource pool 14 are minimum, as storage extents with high priorities on the selection screen. Therefore, it becomes possible to select a storage extent so that a load is not concentrated on a specific RAID group with ease, which makes it possible to add a storage extent without degrading overall processing performance of a storage subsystem.

(First Modification)

In the embodiment of this invention described above, when a new storage extent is added to a virtual storage resource pool 14, focus is made on the number of storage extents registered in the virtual storage resource pool 14, and addition target storage extents are presented as storage extents with high priorities so that loads on RAID groups are distributed.

In a first modification of the embodiment of this invention, an external storage extent is selected so that loads on the data I/O interfaces 140 on an external storage subsystem side are distributed.

It should be noted here that system configurations shown in FIG. 1 to FIG. 4 in this first modification are the same as those of the embodiment and description thereof will be omitted. In a like manner, the description of the same processing as in the embodiment will be omitted.

Figure 23:
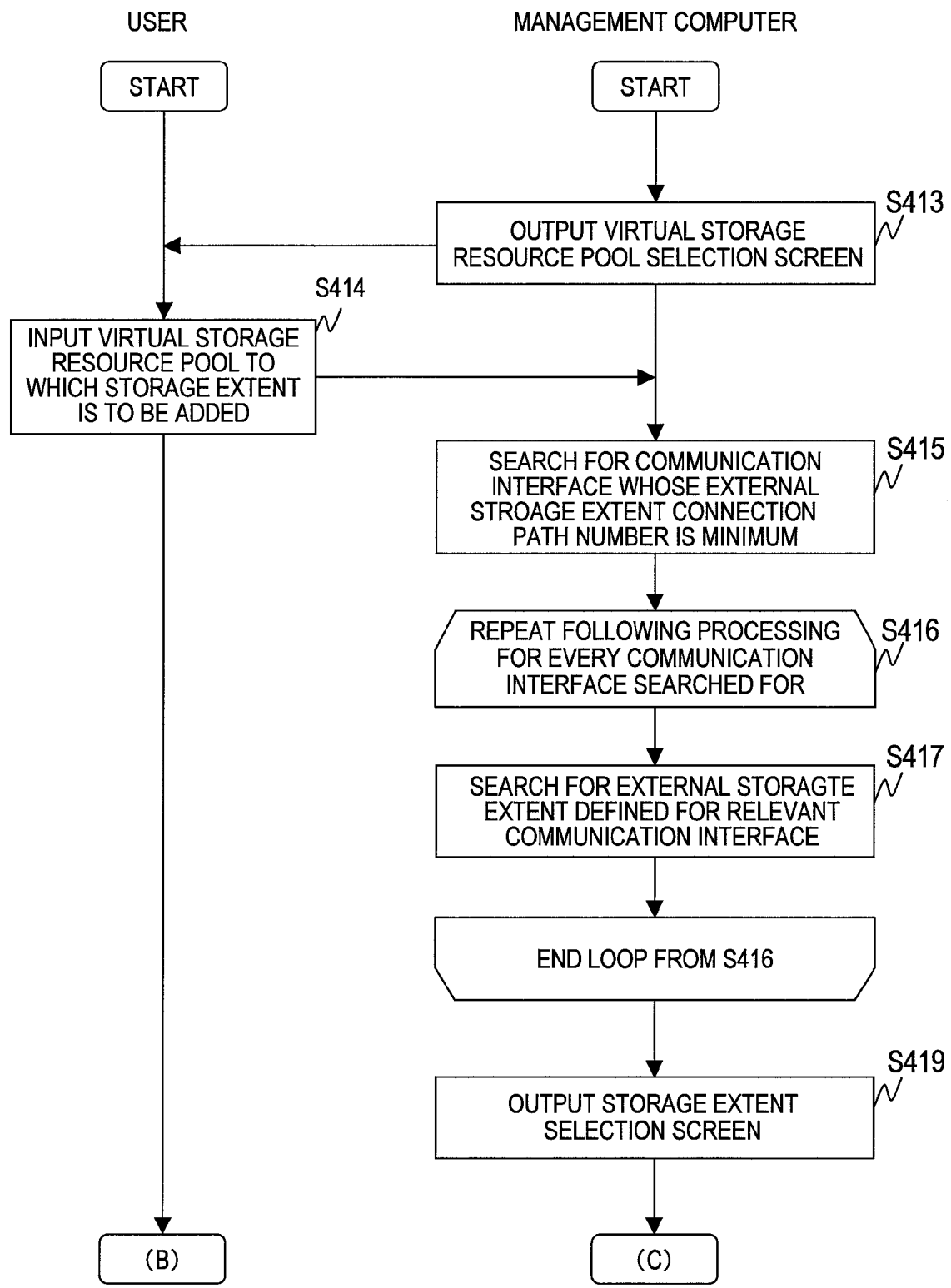
FIG. 23 is a flowchart showing a procedure of processing for additionally registering a new storage extent in a virtual storage resource pool according to the first modification of the embodiment of this invention.

FIG. 23 is a flowchart showing a procedure of processing for additionally registering a new storage extent in a virtual storage resource pool 14 according to the first modification of the embodiment of this invention.

The processor unit 580 of the management computer 500 executes the virtual storage configuration change interface program 5015, thereby outputting an interface for receiving an operation to add a virtual storage extent to the output interface 575 (S413). The interface for receiving the virtual storage extent addition operation is the same as that of the storage extent selection screen 5021 shown in FIG. 21.

The processor unit 580 of the management computer 500 receives input of a virtual storage resource pool in which a virtual storage extent is to be registered (S414).

The processor unit 580 of the management computer 500 executes the virtual storage configuration change program 5014, thereby searching for every data I/O interface 140, whose external storage extent connection path number 50123 is minimum value, by referring to the external storage communication path mapping information 5012 (S415).

The processor unit 580 of the management computer 500 carries out the following processing for every data I/O interface 140 found as a result of the processing of Step S415 (S416).

The processor unit 580 of the management computer 500 searches the logical unit configuration information 1003 and obtains every storage extent written in an entry whose data I/O interface 140 recorded in the communication interface identification information 10031 coincides with a processing target data I/O interface 140 (S417).

The processor unit 580 of the management computer 500 outputs every storage extent obtained as a result of the processing described above to an interface for storage extent selection (S419). As the interface, it is possible to use the storage extent selection screen 5021 shown in FIG. 21. In this case, as candidates for a storage extent to be added, besides the storage extent of the external storage subsystem found as a result of the processing described above, storage extents in the storage subsystem may be displayed at the same time. By selecting the storage extent to be added from among both of the storage extents in the storage subsystem and the external storage subsystem in this manner, it becomes possible to select a configuration with more flexibility.

Following this, the processor unit 580 of the management computer 500 receives selection of a storage extent, and the processing by the user and the management computer 500 continues to the processing procedure shown in FIG. 20.

Here, a modification will be described in which, when there is a performance difference between the communication bandwidths of the data I/O interfaces 140, a load is distributed by adding a new storage extent to a virtual storage resource pool 14 with consideration given to the communication bandwidths.

Figure 24:
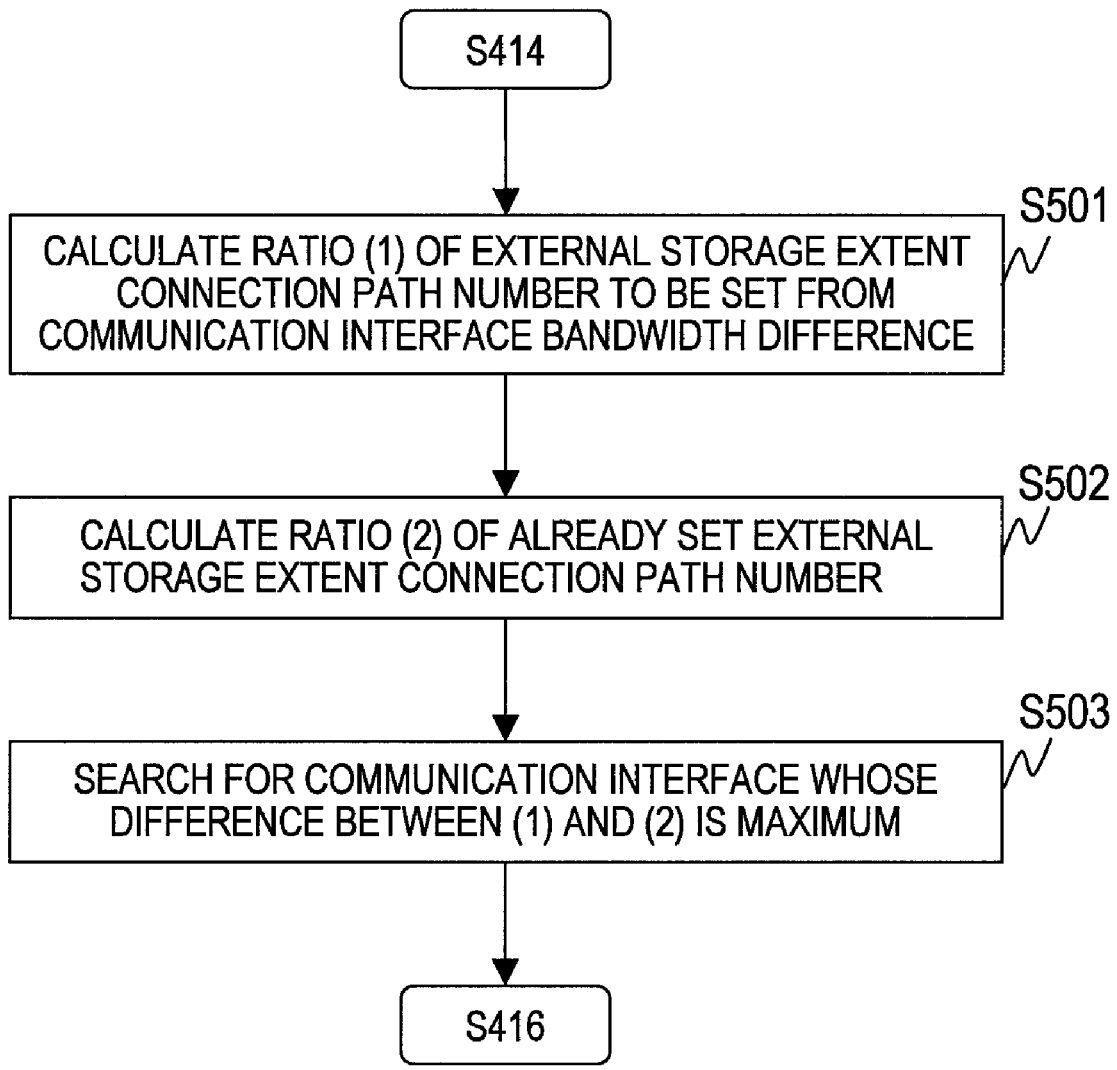
FIG. 24 is a flowchart showing a procedure of processing for searching for a storage extent so that loads on the data I/O interfaces connected with the external storage subsystem are distributed according to the first modification of the embodiment of this invention.

FIG. 24 is a flowchart showing a procedure of processing for searching for a storage extent so that loads on the data I/O interfaces 140 connected with the external storage subsystem are distributed according to the first modification of the embodiment of this invention. More specifically, instead of the processing of Step S415 in which every data I/O interface 140, whose external storage extent connection path number is minimum, is searched for, processing of Steps S501 to S503 shown in FIG. 24 is carried out.

Upon receiving an input of a virtual storage resource pool 14 from the user through the processing of Step S414, the processor unit 580 of the management computer 500 calculates a ratio between the numbers of external storage extent connection paths defined for respective data I/O interfaces 140 by referring to the communication interface bandwidths 50122 of the external storage communication path mapping information 5012 (S501). For instance, as shown in FIG. 15, since the bandwidths of the communication interfaces "PT-11" and "PT-12" are "1 Gbps" and "2 Gbps", the performance ratio becomes "1:2".

The processor unit 580 of the management computer 500 calculates a ratio between the numbers of already allocated paths with respect to the ratio between the numbers of paths calculated in the processing of Step S501 by referring to the external storage extent connection path numbers 50123 (S502). For instance, in FIG. 15, the ratio between the external storage extent connection path numbers of the communication interfaces "PT-11" and "PT-12" is "1:3".

When a new storage extent is added to a virtual storage resource pool 14 with consideration given to the communication bandwidths of the data I/O interfaces 140 as described above, it is preferable that the performance ratio between the data I/O interfaces 140 and the ratio between the numbers of connected paths be the same.

Thus, the processor unit 580 of the management computer 500 obtains a data I/O interface 140 whose difference between the performance ratio and the ratio between the numbers of connected paths is maximum (S503). More specifically, the performance ratio between the data I/O interfaces 140 is "1:2" and the ratio between the numbers of connected paths before addition is "1:3". Therefore, when the storage extent is added so as to be connected to "PT-11", the ratio between the numbers of connected paths becomes "2:3". On the other hand, when the storage extent is added so as to be connected to "PT-12", the ratio becomes "1:4". Consequently, when the storage extent is added to "PT-11", the ratio between the numbers of connected paths after addition comes close to the performance ratio. Accordingly, in the configuration shown in FIG. 15, "PT-11" is selected.

Figure 25:
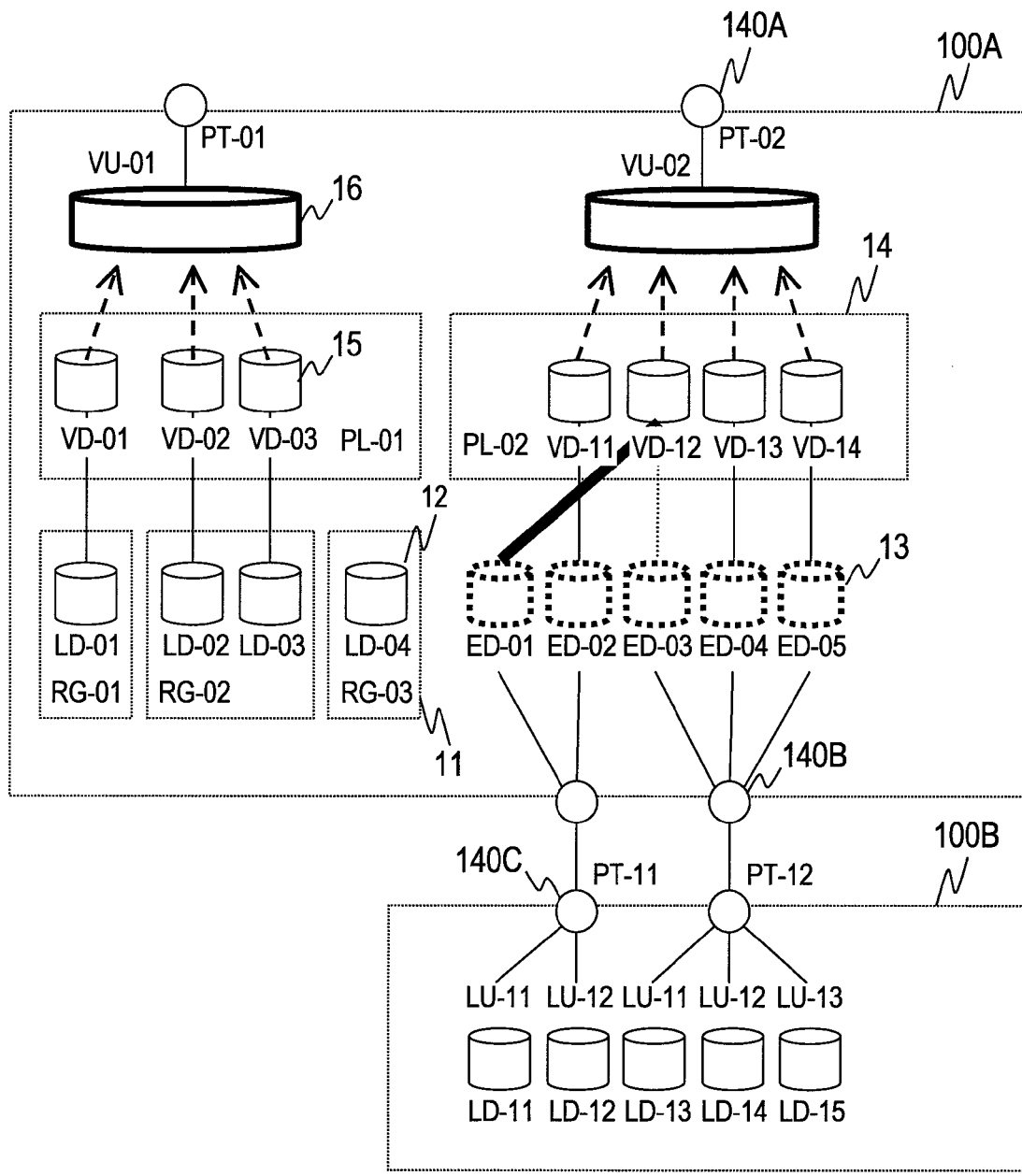
FIG. 25 is a diagram showing a logical configuration in which a load is distributed through the virtual storage extent selection and addition processing according to the first modification of the embodiment of this invention.

FIG. 25 shows an example of a configuration in which a load is distributed through the virtual storage extent 15 selection and addition processing according to the first modification of the embodiment of this invention.

Referring to FIG. 5, as described above, in the virtual storage resource pool "PL-02", the external storage extents "ED-02", "ED-03", "ED-04", and "ED-05" are registered as virtual storage extents. When an attempt is made to equally distribute a load by equally allocating areas to these virtual storage extents 15, the data I/O interface 140 "PT-11" on an external storage subsystem side has only one path that is a path to "LD-12" but the data I/O interface 140 "PT-12" has three paths that are paths to "LD-13", "LD-14", and "LD-15", so the load is concentrated on "PT-12".

In the first modification of the embodiment, through the processing of Step S415 in FIG. 23, a storage extent to be connected to a communication interface whose external storage extent connection path number is minimum is allocated. Therefore, in FIG. 5, at a point when the virtual storage extents "VD-11", "VD-13", and "VD-14" are registered, when the virtual storage extent 15 "VD-12" is newly added, it becomes possible to associate not the storage extent "ED-03" (dotted line in FIG. 25) but the storage extent "ED-01" (thick line in FIG. 25) connected to the communication interface "PT-11" with the virtual storage extent "VD-12". By selecting the storage extent to be registered in the virtual storage resource pool 14 in this manner, it becomes possible to avoid a situation in which processing performance is degraded due to concentration of the load on the specific data I/O interface "PT-12".

According to the first modification of the embodiment, an external storage extent is selected so that loads on the data I/O interfaces 140 on the external storage subsystem side are distributed, so it becomes possible to prevent a situation in which the data I/O interfaces 140 become a bottleneck and performance is deteriorated.

In addition, according to the first modification of the embodiment, the numbers of paths connected to respective data I/O interfaces 140 are determined based on the ratio between the bandwidths of the interfaces, so it becomes possible to equalize loads based on the bandwidth ratio.

In the aforementioned embodiment of this invention and first modification of the embodiment, a technique has been proposed with which, when a virtual storage extent 15 is newly added to a virtual storage resource pool 14, a storage extent for distributing a load appropriately is selected. However, there is a possibility that when the configuration is changed in course of system operation due to deletion of a virtual storage resource pool 14, deletion of a storage extent, or the like, the load is not distributed appropriately. In view of this problem, in a second modification of the embodiment, a technique will be described with which, when a system is changed to a configuration in which a load is concentrated on a specific RAID group 11, the system is reconstructed to have a configuration in which the load is equally distributed.

(Second Modification)

Figure 26:
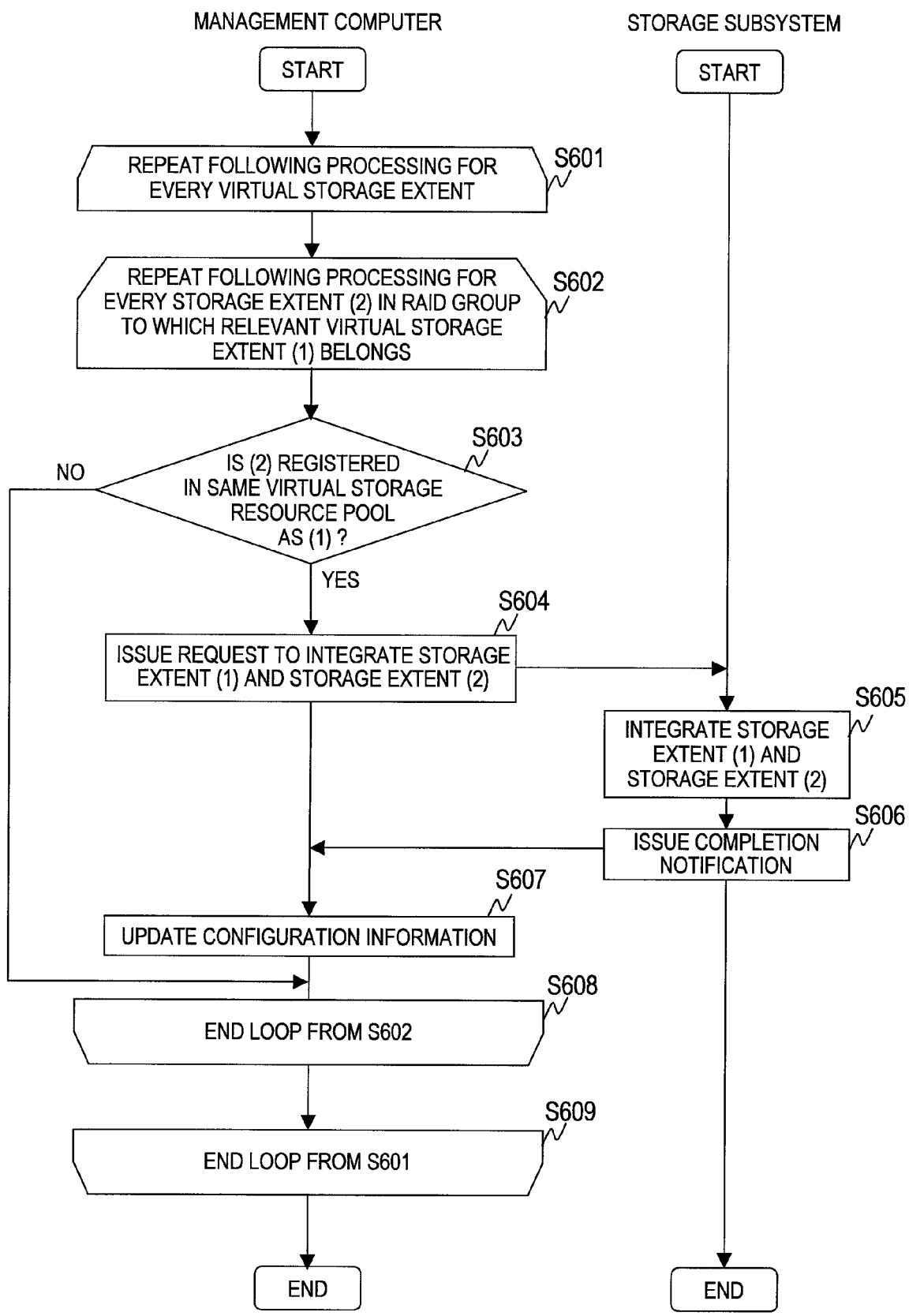
FIG. 26 is a flowchart showing a procedure of processing for equalizing the registration numbers when there are variations in virtual storage extent registration numbers of storage extents configuring the RAID groups, according to the second modification of the embodiment of this invention.

FIG. 26 is a flowchart showing a procedure of processing for equalizing the registration numbers when there are variations in virtual storage extent registration numbers of storage extents configuring the RAID groups 11, according to the second modification of the embodiment of this invention. It should be noted that this processing is achieved through execution of the virtual storage configuration change program 5014 by the processor unit 580 of the management computer 500.

The processor unit 580 of the management computer 500 carries out the following processing for every virtual storage extent 15 recorded in the storage extent identification information 10053 of the virtual storage resource pool configuration information 1005 (S601). It should be noted that when there exists a performance difference between the storage extents 12 provided in the storage subsystem 100 and the external storage extents 13, it is also possible to achieve load equalization while limiting targets of the processing of Step S601 by setting only the storage extents 12 in the storage subsystem 100 as the targets.

Next, the processor unit 580 of the management computer 500 searches for an entry of the storage extent configuration information 1002 whose storage extent recorded in the storage extent identification information 10021 coincides with a storage extent corresponding to a virtual storage extent 15 that is a processing target. Then, the processor unit 580 of the management computer 500 obtains a RAID group 11 from the RAID group identification information 10022 in the found entry.

The processor unit 580 of the management computer 500 searches for an entry of the storage extent configuration information 1002 whose RAID group 11 recorded in the RAID group identification information 10022 coincides with the obtained RAID group 11. Then, the processor unit 580 of the management computer 500 carries out the following processing for a storage extent recorded in the storage extent identification information 10021 in the found entry (S602).

Here, a case where the virtual storage extent 15 "VD-02" has been selected as the processing target of Step S601 will be described in a concrete manner. The virtual storage resource pool configuration information 1005 shows that a storage extent corresponding to the virtual storage extent 15 "VD-02" is "LD-02". Therefore, the processor unit 580 of the management computer 500 first obtains an entry of the storage extent configuration information 1002 whose value of the storage extent identification information 10021 is "LD-02".

The value of the RAID group identification information 10022 in the obtained entry is "RG-02", so the processor unit 580 of the management computer 500 further searches for an entry of the storage extent configuration information 1002 whose value of the RAID group identification information 10022 coincides with "RG-02". As a result, the storage extents "LD-02" and "LD-03" are found and a loop starting from Step S602 is carried out for these storage extents.

Following this, the processor unit 580 of the management computer 500 judges whether the storage extent (hereinafter referred to as "storage extent (2)") set as a processing target in Step S602 and the storage extent (hereinafter referred to as "storage extent (1)") that corresponds to the virtual storage extent set as the processing target in Step S601 are registered in the same virtual storage resource pool 14 by referring to the virtual storage resource pool configuration information 1005 (S603). In the processing of Step S603, it is only necessary that entries, whose storage extent identification information 10053 corresponds to the storage extent (1) and the storage extent (2), are searched for and is judged whether values of the virtual storage resource pool identification information 10051 recorded in the found entries coincide with each other.

When the storage extent (1) and the storage extent (2) are registered in the same virtual storage resource pool 14 (result of the judgment in Step S603 is "Yes"), the processor unit 580 of the management computer 500 transmits a message requesting integration of the storage extent (1) and the storage extent (2) to the storage subsystem 100 (S604). The integration of storage extents means provision of the storage extents as one storage extent to the outside by allocating the same virtual storage extent as virtual storage extents corresponding to the storage extents.

Upon receiving the request to integrate the storage extent (1) and the storage extent (2), the storage subsystem 100 searches for an entry of the virtual storage resource pool configuration information 1005 whose storage extent identification information 10053 coincides with the storage extent (2), and updates a value of the virtual storage extent identification information 10052 in the found entry to a value of the virtual storage extent identification information 10052 of the storage extent (1) (S605). For instance, when the storage extents "LD-02" and "LD-03" described above are integrated, it is only necessary that the value of the virtual storage extent identification information 10052 in an entry of the virtual storage resource pool configuration information 1005, whose storage extent identification information 10053 coincides with "LD-03", is updated to "VD-02" that is the virtual storage extent 15 of "LD-02".

When the processing of Step S605 is completed, the storage subsystem 100 transmits a completion notification to the management computer 500 (S606).

Upon receiving the integration completion notification from the storage subsystem 100, the management computer 500 updates the storage configuration information (S607).

Figure 27:
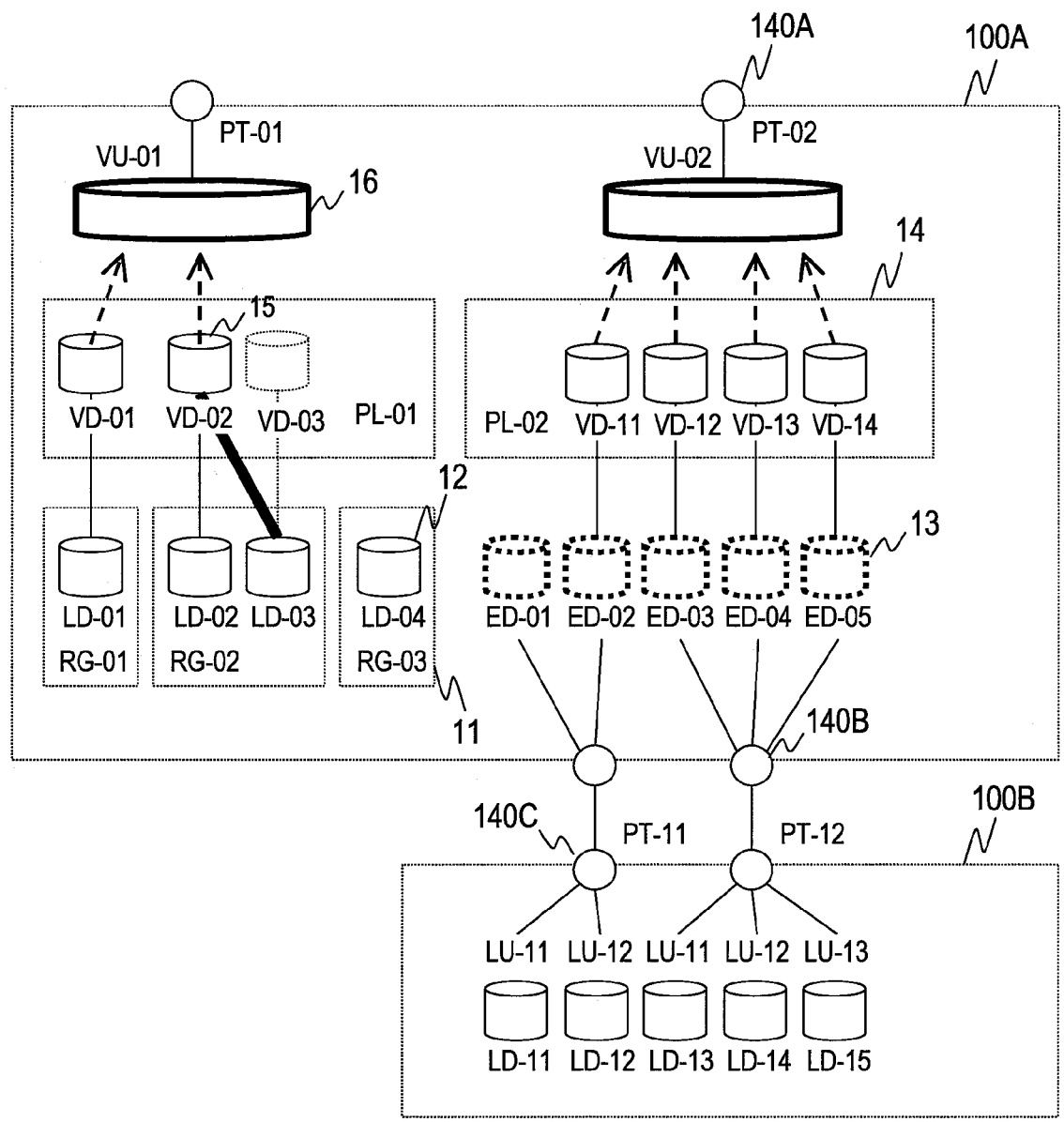
FIG. 27 is a diagram showing a logical configuration in which a configuration under a state where a load is concentrated as shown in FIG. 5 is reconstructed so that the load is distributed, in accordance with the processing procedure according to the second modification of the embodiment of this invention.

FIG. 27 shows an example of a storage configuration in which a configuration under a state where a load is concentrated as shown in FIG. 5 is reconstructed so that the load is distributed, in accordance with the processing procedure according to the second modification of the embodiment of this invention.

In the second modification of the embodiment, the processor unit 580 of the management computer 500 extracts storage extents, whose virtual storage extents are to be integrated, through the processing of Step S603 in FIG. 26, and integrates the extracted storage extents through the processing of Step S605. More specifically, referring to FIG. 27, the logical storage extent "LD-03" configuring the virtual storage extent "VD-03" is integrated into the virtual storage extent "VD-02" corresponding to the storage extent "LD-02" belonging to the same RAID group (changed from a configuration indicated by a dotted line to a configuration indicated by a thick line in FIG. 27). By integrating the virtual storage extents in this manner, it becomes possible to prevent a situation in which extent allocation is concentrated on the specific RAID group "RG-02".

According to the second modification of the embodiment, a plurality of virtual storage extents 15 allocated to the same RAID group 11 are integrated into one virtual storage extent 15, so a situation is prevented in which a load is concentrated on a specific RAID group 11, which makes it possible to suppress degradation of performance of the storage subsystem.

(Third Modification)

Next, a third modification of the embodiment will be described in which when there occurs unevenness in the numbers of external connection paths connected to the data I/O interfaces 140 on the external storage subsystem side, a configuration is changed so that the numbers are equalized.

Figure 28:
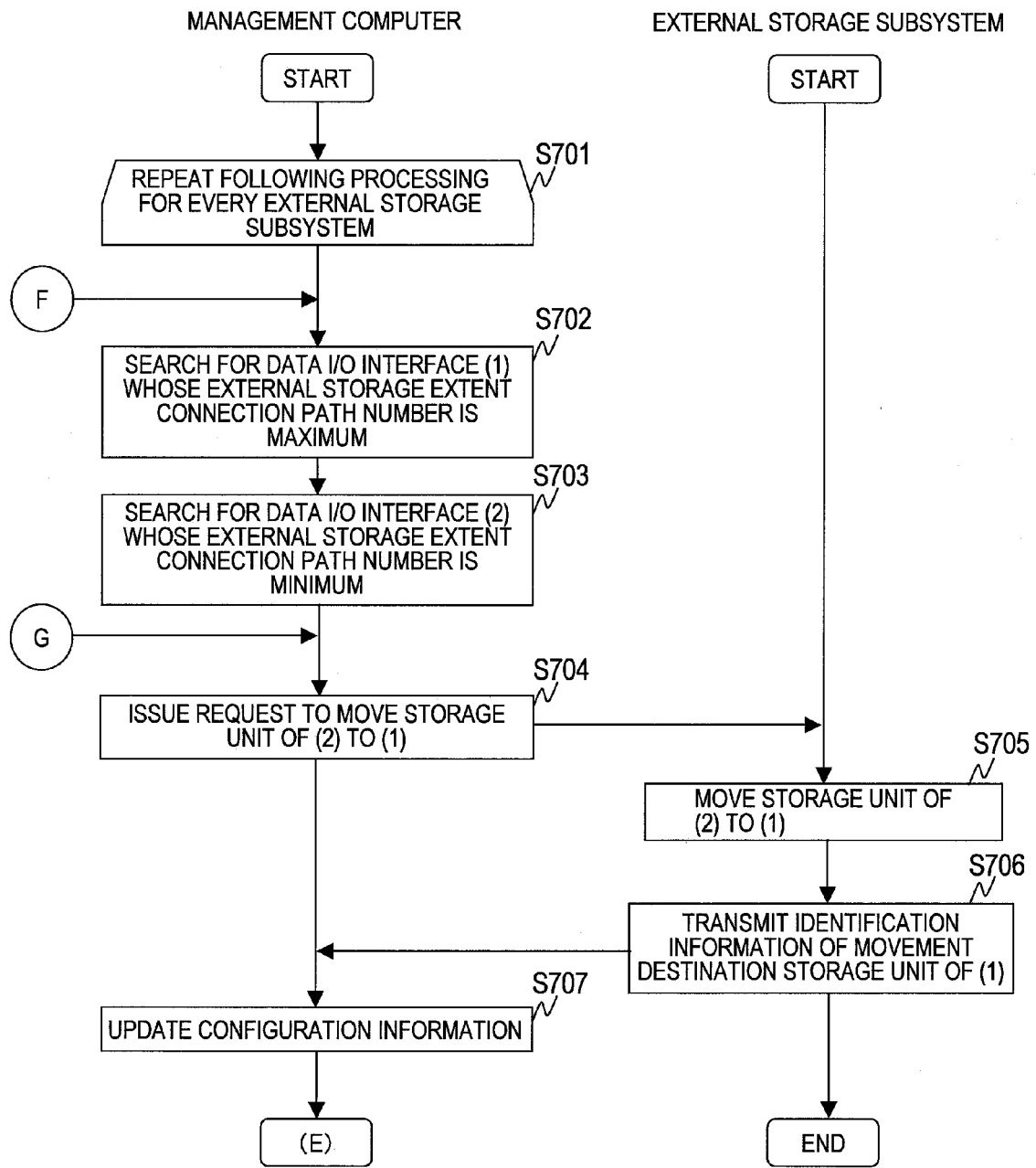
FIG. 28 is flowchart showing a former half portion of a processing for equalizing the numbers of external connection paths connected to the data I/O interfaces on the external storage subsystem side according to the third modification of the embodiment of this invention.
Figure 29:
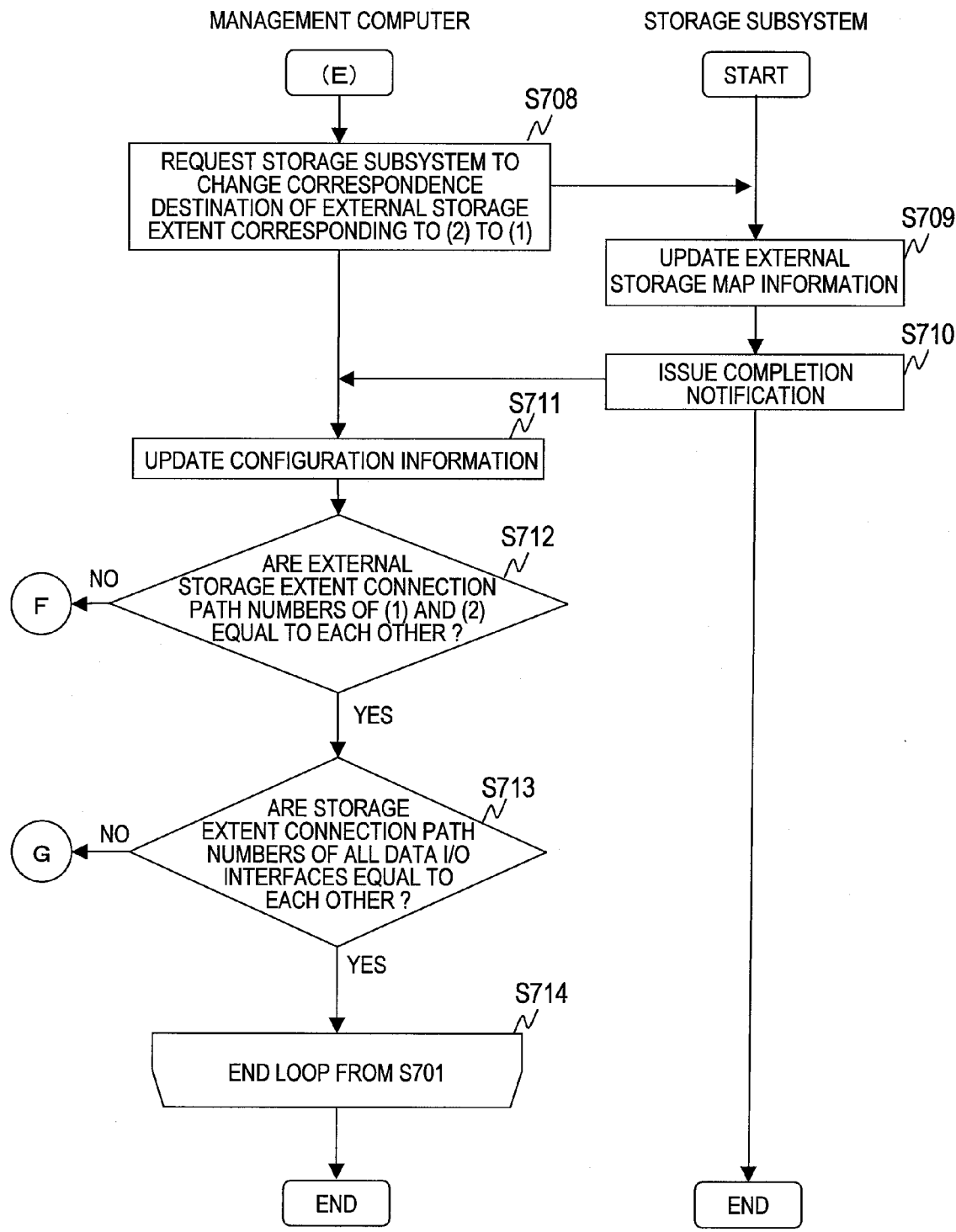
FIG. 29 is flowchart showing a latter half portion of processing for equalizing the numbers of external connection paths connected to the data I/O interfaces on the external storage subsystem side according to the third modification of the embodiment of this invention.

FIG. 28 and FIG. 29 are flowcharts showing a procedure of processing for equalizing the numbers of external connection paths connected to the data I/O interfaces 140 on the external storage subsystem side according to the third modification of the embodiment of this invention. Processing carried out at the management computer 500 is achieved through execution of the virtual storage configuration change program 5014.

FIG. 28 shows a former half portion of the processing for equalizing the numbers of external connection paths connected to the data I/O interfaces 140 on the external storage subsystem side according to the third modification of the embodiment of this invention, in which an instruction to move a storage unit is issued to the external storage subsystem.

FIG. 29 shows a latter half portion of the processing for equalizing the numbers of external connection paths connected to the data I/O interfaces 140 on the external storage subsystem side according to the third modification of the embodiment of this invention, in which an instruction to update the external storage map information is issued to the storage subsystem.

The processor unit 580 of the management computer 500 carries out the following processing for a storage subsystem 100 whose identification name is recorded as a storage subsystem identification name 10073 in the data I/O interface configuration information 1007 (S701).

The processor unit 580 of the management computer 500 searches the external storage communication path mapping information 5012 and obtains an entry whose external storage extent connection path number 50123 is maximum (S702). A data I/O interface 140 recorded in the communication interface identification information 50121 in the obtained entry is set as the "communication interface (1)".

In a like manner, the processor unit 580 of the management computer 500 searches for a data I/O interface 140, whose external storage extent connection path number is minimum, and sets the found interface 140 as the "communication interface (2)" (S703).

Next, the processor unit 580 of the management computer 500 obtains an entry of the external storage map information 1004 whose communication interface identification information 10042 coincides with the communication interface (2). Following this, the processor unit 580 of the management computer 500 transmits a request message to move a storage unit recorded in the obtained entry to the communication interface (1) to the external storage subsystem (S704).

Upon receiving the request message, the external storage subsystem 100B searches for an entry of the logical unit configuration information 1003 corresponding to the designated storage unit. Then, the external storage subsystem 100B rewrites the communication interface identification information 10031 in the found entry to a value of the communication interface (1) and, at the same time, updates a value of the storage unit identification information 10032 so that it does not coincide with other storage unit identification information values corresponding to the communication interface (1) (S705).

For instance, referring to FIG. 15, the communication interface (1) is "PT-11" and the communication interface (2) is "PT-12". Therefore, the processor unit 580 of the management computer 500 requests to move "LU-11", that is, the storage extent "LD-13", out of storage units connected to "PT-12", to "PT-11" that is the communication interface (1).

The external storage subsystem 100B updates a value of the communication interface identification information 10031 in an entry of the logical unit configuration information 1003, whose value of the storage extent identification information 10033 coincides with "LD-13", to "PT-11". In addition, the external storage subsystem 100B updates a value of the storage unit identification information 10032 to "LU-13" that is a value other than already recorded "LU-11" and "LU-12". In this manner, the movement of the storage unit is completed.

The external storage subsystem 100B stores storage unit identification information after the completion of the movement to the communication interface (1) in a completion notification message in the processing of Step S705, and transmits the message to the management computer 500 (S706).

Upon receiving the storage unit movement completion notification message, the processor unit 580 of the management computer 500 updates the configuration information based on the storage unit identification information after the completion of the movement included in the message (S707).

Next, the processor unit 580 of the management computer 500 searches the external storage map information 1004 and obtains an entry whose communication interface identification information 10042 and storage unit identification information 10043 coincide with those of the movement target storage unit of the communication interface (2) whose movement has been instructed in the processing of Step S704. Then, the processor unit 580 of the management computer 500 transmits a request message to update a correspondence destination of an external storage extent 13 in the obtained entry to the destination storage unit of the communication interface (1) designated as the destination through the processing of Step S704 (S708).

Upon receiving the request message, the storage subsystem 100 updates the communication interface identification information 10042 and the storage unit identification information 10043 in the entry of the external storage map information 1004 (S709).

In the example described above, the storage unit "LU-11" defined for the communication interface (2), that is, "PT-12" is the movement target, so the storage subsystem 100 updates an entry for the external storage extent "ED-03" of the external storage map information 1004. More specifically, the management computer 500 issues, to the storage subsystem 100, a request to update the communication interface identification information 10042 in the entry to "PT-11" that is the communication interface (1) and update the storage unit identification information 10043 to "LU-13". In response to the request, the storage subsystem 100 updates the external storage map information 1004.

Following this, the storage subsystem 100 transmits an update processing completion notification (S710).

Upon receiving the completion notification transmitted from the storage subsystem 100, the processor unit 580 of the management computer 500 updates the configuration information (S711).

When the processing described above is completed, the processor unit 580 of the management computer 500 updates the external storage communication path mapping information 5012.

In addition, the processor unit 580 of the management computer 500 searches for an entry, whose value of the communication interface identification information 50121 coincides with the communication interface (1), and an entry, whose value of the communication interface identification information 50121 coincides with the communication interface (2), and judges whether values of the external storage extent connection path numbers 50123 in the entries are equal to each other (S712). It should be noted that it is not required to judge that the values completely coincide with each other and it is possible to regard that the values are equal to each other when a difference therebetween is small, for instance, when the difference is "1".

When having judged that the external storage extent connection path number 50123 of the communication interface (1) and that of the communication interface (2) are not equal to each other (result of the judgment in Step S712 is "No"), the processor unit 580 of the management computer 500 returns to the processing of Step S704, and repeatedly carries out the processing for moving one of the storage units of the communication interface (2) to the communication interface (1).

On the other hand, when having judged that the external storage extent connection path number 50123 of the communication interface (1) and that of the communication interface (2) are equal to each other (result of the judgment in Step S712 is "Yes"), the processor unit 580 of the management computer 500 judges whether all of the external storage extent connection path numbers 50123 of the data I/O interfaces 140 equipped to the external storage subsystem are equal to each other (S713).

When having judged that all of the external storage extent connection path numbers 50123 of the data I/O interfaces 140 equipped to the external storage subsystem are not equal to each other (result of the judgment in Step S713 is "No"), the processor unit 580 of the management computer 500 returns to the processing of Step S702 and repeats the path number equalizing processing for a different data I/O interface 140.

On the other hand, when having judged that all of the external storage extent connection path numbers 50123 of the data I/O interfaces 140 equipped to the external storage subsystem are equal to each other (result of the judgment in Step S713 is "Yes"), the processor unit 580 of the management computer 500 repeats the equalizing processing for another external storage subsystem (S714).

Figure 30:
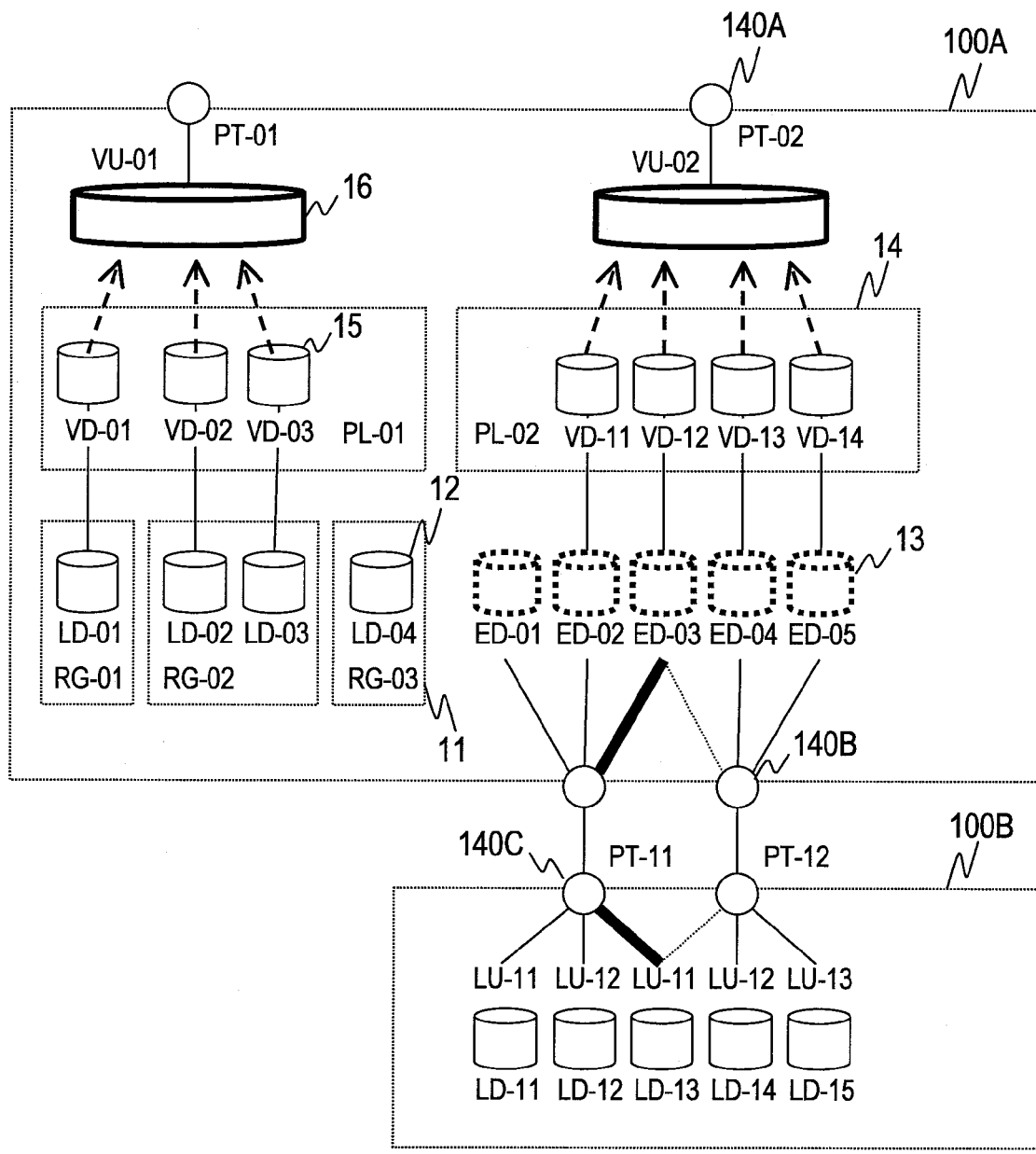
FIG. 30 a diagram showing a logical configuration in which a configuration under a state, in which a load is concentrated as shown in FIG. 5, is reconstructed so that the load is distributed in accordance with the processing procedure according to the third modification of the embodiment of this invention.

FIG. 30 shows an example of a storage configuration in which a configuration under a state, in which a load is concentrated as shown in FIG. 5, is reconstructed so that the load is distributed in accordance with the processing procedure according to the third modification of the embodiment of this invention.

In the third modification of the embodiment, the processor unit 580 of the management computer 500 moves a connection path of an external storage extent through the processing of Step S704 in FIG. 28. More specifically, the processor unit 580 of the management computer 500 moves the connection path of the external storage extent "ED-03" from the data I/O interface "PT-12" to "PT-11" (changed from a configuration indicated by a dotted line to a configuration indicated by a thick line in FIG. 30). By equalizing the numbers of external connection paths in this manner ("PT-11" corresponds to two paths to "LD-12" and "LD-13" and "PT-12" corresponds to two paths to "LD-14" and "LD-15"), it becomes possible to avoid a situation in which performance is degraded due to concentration of a load on a specific data I/O interface 140.

According to the third modification of the embodiment, it becomes possible for the processor unit 580 of the management computer 500 to equalize loads on the data I/O interfaces 140 by equalizing the numbers of the external storage extents connected to the data I/O interfaces 140. Also, the processor unit 580 of the management computer 500 may distribute the connection paths based on the bandwidths of the data I/O interfaces 140.

While the present invention has been described in detail and pictorially in the accompanying drawings, the present invention is not limited to such detail but covers various obvious modifications and equivalent arrangements, which fall within the purview of the appended claims.

What is claimed is:

1. A storage subsystem configuration management method for use in a computer system,
wherein the computer system comprises a storage subsystem, a host computer connected to the storage subsystem through a network, and a management computer that accesses the storage subsystem and the host computer,
wherein the storage subsystem comprises a first interface that is connected to the network, a first processor that is connected to the first interface, a first memory that is connected to the first processor, and a storage device that stores data read and written by the host computer,
wherein the host computer comprises a second interface that is connected to the network, a second processor that is connected to the second interface, and a second memory that is connected to the second processor,
wherein the management computer comprises a third interface that is connected to the network, a third processor that is connected to the third interface, and a third memory that is connected to the third processor,
wherein the storage subsystem comprises a virtual storage resource pool configured by at least one virtual storage extent, and
wherein the virtual storage extent is allocated with at least one of a storage resource of the storage device and a storage resource of an external storage device provided by an external storage subsystem connected to the storage subsystem equipped with the storage device, and is provided to the host computer as a storage extent from and into which data is read and written,
the storage subsystem configuration management method comprising:
obtaining, by the management computer, storage configuration information, which includes at least one of information about a configuration of a RAID (Redundant Array of Independent Disks) group configured by the storage device and information about a configuration of an interface connected to the external storage device, from the storage subsystem through the third interface;
obtaining, by the management computer, hardware resource use information, which includes at least one of information about use of the storage resource provided to the host computer through the virtual storage extent and information about use of the interface connected to the external storage device, based on the obtained storage configuration information;
determining, by the management computer, based on the obtained hardware resource use information, a configuration of the storage subsystem to prevent from concentrating a load on a specific hardware resource;
transmitting, by the management computer, a configuration change instruction to make a change to the determined configuration to the storage subsystem; and
making, by the storage subsystem, a configuration change based on the configuration change instruction received from the management computer through the first interface.

2. The storage subsystem configuration management method according to claim 1, further comprising:
presenting, by the management computer, when a virtual storage extent is to be added to the virtual storage resource pool and a storage resource is to be allocated to the virtual storage extent, a hardware resource, whose load is smaller than a predetermined value, as a candidate based on the obtained hardware resource use information; and
identifying, by the management computer, based on the storage configuration information, a storage resource that uses a selected hardware resource, and allocating the identified storage resource to the added virtual storage extent.

3. The storage subsystem configuration management method according to claim 1, further comprising:
allocating, by the management computer, when a plurality of virtual storage extents allocated with storage resources belonging to the same RAID group are included in one virtual storage resource pool, a storage resource belonging to a RAID group that is different from the same RAID group to another virtual storage extent allocated with a storage resource belonging to the same RAID group.

4. The storage subsystem configuration management method according to claim 1, further comprising:
selecting, by the management computer, when the storage resource is allocated by the external storage device provided by the external storage subsystem, a fourth interface, which is connectable to the external storage device and whose load is small, based on a use state of the fourth interface; and
connecting, by the management computer, the external storage device to the fourth interface whose load is small.

5. The storage subsystem configuration management method according to claim 4, wherein the fourth interface whose load is small is selected based on a bandwidth of the fourth interface.

6. The storage subsystem configuration management method according to claim 1, further comprising:
integrating, by the management computer, when a plurality of virtual storage extents using the same hardware resource are included in the virtual storage resource pool, the plurality of virtual storage extents using the same hardware resource into one virtual storage extent.

7. The storage subsystem configuration management method according to claim 1, further comprising:
integrating, by the management computer, when a plurality of virtual storage extents allocated with storage resources configuring the same RAID group are included in the virtual storage resource pool, the plurality of virtual storage extents allocated with the storage resources configuring the same RAID group into one virtual storage extent.

8. The storage subsystem configuration management method according to claim 2,
wherein the management computer further comprises a display device, and an input device, and
wherein the storage subsystem configuration management method further comprises:
displaying, by the management computer, a screen for receiving selection of the virtual storage resource pool;
extracting, by the management computer, after having received the selection of the virtual storage resource pool, a storage resource using a hardware resource, whose load is small, based on the hardware resource use information;
displaying, by the management computer, the extracted storage resource as a candidate for a storage resource to be added to the selected virtual storage resource pool; and
receiving, by the management computer, selection of the extracted storage resource.

9. A management computer, which is connected to a storage subsystem and a host computer connected to the storage subsystem through a network, comprising:

a processor;

a memory; and a first interface, wherein the storage subsystem comprises a storage device which stores data read and written by the host computer, a storage controller that controls input and output of data into and from the storage device, and a virtual storage resource pool configured by at least one virtual storage extent, wherein the virtual storage extent is allocated with at least one of a storage resource of the storage device and a storage resource of an external storage device provided by an external storage subsystem connected to the storage subsystem equipped with the storage device, and is provided to the host computer as a storage extent from and into which data is read and written, and wherein the processor is configured to:

obtain storage configuration information, which comprises at least one of information about a configuration of a RAID (Redundant Array of Independent Disks) group configured by the storage device and information about a configuration of an interface connected to the external storage device, from the storage subsystem through the first interface;

obtain hardware resource use information, which comprises at least one of information about use of the storage resource provided to the host computer through the virtual storage extent and information about use of the interface connected to the external storage device, based on the obtained storage configuration information;

determine, based on the obtained hardware resource use information, a configuration of the storage subsystem to prevent from concentrating a load on a specific hardware resource; and transmit a configuration change instruction to make a change to the determined configuration to the storage subsystem.

10. The management computer according to claim 9, wherein the processor is further configured to:

present, when a storage resource is to be added to the virtual storage resource pool, a hardware resource, whose load is smaller than a predetermined value, as a candidate based on the obtained hardware resource use information; and identify, based on the storage configuration information, a storage resource, which uses a selected hardware resource, and determine the configuration of the storage subsystem so that the identified storage resource is allocated to the added virtual storage extent.

11. The management computer according to claim 9, wherein when a plurality of virtual storage extents allocated with storage resources belonging to the same RAID group are included in one virtual storage resource pool, the processor determines the configuration of the storage subsystem so that a storage resource belonging to a RAID group that is different from the same RAID group is allocated to another virtual storage extent allocated with a storage resource belonging to the same RAID group.

12. The management computer according to claim 9, wherein the processor is further configured to:

select, when the storage resource is allocated by the external storage device provided by the external storage subsystem, a second interface, which is connectable to the external storage device and whose load is small, based on a use state of the second interface; and determine the configuration of the storage subsystem so that the external storage device is connected to the second interface whose load is small.

13. The management computer according to claim 12, wherein the second interface whose load is small is selected based on a bandwidth of the second interface.

14. The management computer according to claim 9, wherein when a plurality of virtual storage extents using the same hardware resource are included in the virtual storage resource pool, the processor determines the configuration of the storage subsystem so that the plurality of virtual storage extents using the same hardware resource are integrated into one virtual storage extent.

15. The management computer according to claim 9, wherein when a plurality of virtual storage extents allocated with storage resources configuring the same RAID group are included in the virtual storage resource pool, the processor determines the configuration of the storage subsystem so that the plurality of virtual storage extents allocated with the storage resources configuring the same RAID group are integrated into one virtual storage extent.

16. The management computer according to claim 10, further comprising:

a display device; and an input device, wherein the processor is configured to:

display a screen for receiving selection of the virtual storage resource pool;

extract, after having received the selection of the virtual storage resource pool, a storage resource using a hardware resource, whose load is small, based on the hardware resource use information;

display the extracted storage resource as a candidate for a storage resource to be added to the selected virtual storage resource pool; and receive selection of the extracted storage resource.

17. A computer system, comprising:

a storage subsystem;

a host computer connected to the storage subsystem through a network; and a management computer that is capable of accessing the storage subsystem and the host computer, wherein the storage subsystem comprises a first interface that is connected to the network, a first processor that is connected to the first interface, a first memory that is connected to the first processor, and a storage device that stores data read and written by the host computer, wherein the host computer comprises a second interface that is connected to the network, a second processor that is connected to the second interface, and a second memory that is connected to the second processor, wherein the management computer comprises a third interface that is connected to the network, a third processor that is connected to the third interface, and a third memory that is connected to the third processor, wherein the storage subsystem comprises a virtual storage resource pool configured by at least one virtual storage extent, wherein the virtual storage extent is allocated with at least one of a storage resource of the storage device and a storage resource of an external storage device provided by an external storage subsystem connected to the storage subsystem equipped with the storage device, and is provided to the host computer as a storage extent from and into which data is read and written, wherein the management computer is configured to:
obtain storage configuration information, which comprises at least one of information about a configuration of a RAID group configured by the storage device and information about a configuration of an interface connected to the external storage device, from the storage subsystem through the third interface;
obtain hardware resource use information, which comprises at least one of information about use of the storage resource provided to the host computer through the virtual storage extent and information about use of the interface connected to the external storage device, based on the obtained storage configuration information;
determine, based on the obtained hardware resource use information, a configuration of the storage subsystem to prevent from concentrating a load on a specific hardware resource; and
transmit a configuration change instruction to make a change to the determined configuration to the storage subsystem, and
wherein the storage subsystem makes a configuration change based on the configuration change instruction received from the management computer through the first interface.

18. The computer system according to claim 17,
wherein when a plurality of virtual storage extents allocated with storage resources belonging to the same RAID group are included in one virtual storage resource pool, the management computer determines the configuration of the storage subsystem by allocating a storage resource belonging to a RAID group that is different from the same RAID group to another virtual storage extent allocated with a storage resource belonging to the same RAID group, and
wherein loads on the storage resources allocated to the virtual storage extents included in the virtual storage resource pool are equalized by allocating the storage resources to the virtual storage extents included in the virtual storage resource pool so that the allocated storage resources do not belong to the same RAID group through the configuration change by the storage subsystem based on the configuration change instruction transmitted from the management computer.

19. The computer system according to claim 17,
wherein the management computer is configured to:
select, when the storage resource is to be allocated by the external storage device provided by the external storage subsystem, a fourth interface, which is connectable to the external storage device and whose load is small, based on a use state of the fourth interface; and
determine the configuration of the storage subsystem by connecting the external storage device to the fourth interface whose load is small, and
wherein a load on the interface connected to the external storage device is equalized through the configuration change by the storage subsystem based on the configuration change instruction transmitted from the management computer.

* * * * *